US012778153B2

(12) United States Patent
Noori Khoshknab et al.

(10) Patent No.: US 12,778,153 B2
(45) Date of Patent: Nov. 3, 2026

(54) CAVITATION PROCESS FOR PLANT-BASED BEVERAGE PRODUCTION

(71) Applicant: PACIFIC RIDGE AG TECH INC., Saskatoon (CA)

(72) Inventors: Amir Ali Noori Khoshknab, Saskatoon (CA); Robert Paul Harold Cottrell, Aldergrove (CA)

(73) Assignee: PACIFIC RIDGE AG TECH INC., Saskatoon (CA)

( * ) Notice: Subject to any disclaimer, the term of this patent is extended or adjusted under 35 U.S.C. 154(b) by 0 days.

(21) Appl. No.: 19/342,079

(22) Filed: Sep. 26, 2025

(65) Prior Publication Data

US 2026/0144268 A1 May 28, 2026

Related U.S. Application Data

(60) Provisional application No. 63/724,285, filed on Nov. 23, 2024.

(51) Int. Cl.
*A23C 11/10* (2025.01)
*A23L 7/104* (2016.01)

(52) U.S. Cl.
CPC .............. *A23C 11/10* (2013.01); *A23L 7/107* (2016.08)

(58) Field of Classification Search
CPC . A23C 11/10; A23L 7/107; A23L 2/38; A23L 2/66
USPC ........................................................... 426/29
See application file for complete search history.

(56) References Cited

FOREIGN PATENT DOCUMENTS

| | | | | |
|---|---|---|---|---|
| CA | 3168419 A1 * | 1/2024 | ............. | A23C 11/10 |
| CN | 110604242 A | 12/2019 | | |

* cited by examiner

*Primary Examiner* — Subbalakshmi Prakash
(74) *Attorney, Agent, or Firm* — Haynes and Boone, LLP

(57) ABSTRACT

A method of producing a plant-based beverage is disclosed. The method may comprise circulating a mixture including soaked groats, water, an enzyme to break down starch particles, in a container to undergo a hydrodynamic cavitation, to produce the mixture after the circulation as a plant-based uncentrifuged concentrate having a D90 particle size being less than about 600 microns. It has been determined that under certain embodiments, utilizing an associated holding temperature of about 50° C. to about 80° C., and an associated holding time of from about 5 minutes to about 40 minutes can result in improved product outcomes.

13 Claims, 23 Drawing Sheets

CAVITATION PROCESS FOR PLANT-BASED BEVERAGE PRODUCTION

CROSS-REFERENCE TO RELATED APPLICATIONS

This application claims priority to U.S. Provisional Patent Application No. 63/724,285 filed Nov. 23, 2024, entitled “IMPROVEMENTS TO CAVITATION PROCESS,” of which is entirely incorporated by reference for all purposes.

TECHNICAL FIELD

The application relates to methods for producing a beverage from a plant source, and particularly to certain improvements for producing a beverage from grains such as oats based on a particular enhanced combination cavitation process.

BACKGROUND

A balanced diet that includes all of the nutrients the body needs is important for overall health. These nutrients include carbohydrates, fats, proteins, vitamins, minerals, and water. Carbohydrates are the body’s main source of energy. Fats are essential for storing energy, building cell membranes, and protecting organs. Proteins are essential for building and repairing tissues, producing hormones and enzymes, and transporting nutrients. Various protein supplements and protein-containing foods have been developed and marketed to meet the increased protein needs of individuals with specific dietary requirements or health conditions. Beverages from plant-based materials have become a more sustainable alternative to dairy products as the resources from animals consume extensive natural resources.

Producing a homogenous beverage product (e.g., oat milk product) is an important consideration in developing production methods. Producing beverages (e.g., oat milk products) of desirable consumption quality in large quantities is difficult, as the methods that are applied to small batches may not scale accordingly. In particular, understanding how to reduce particle size and improved particle solubility for batch production will help generate specific beverage (e.g., oat milk) production protocols for specific types of oat grain.

Beverages such as oat milk are a diluted product obtained from extracts (e.g., oat extract or oat concentrate) which are obtained from processing grains, such as oat grains. Some current methodologies use enzymes/cavitation methods to produce a large volume of extract (e.g., oat extract) for homogenized beverage (e.g., oat milk) product, but these methodologies may still result in large particle sizes in the product, due to conventional wet milling techniques that present batch processes may use for processing large quantities of groat (e.g., oat groats). While centrifugation may be used to remove some of those large particles, there are other costs, such as increased energy costs, resulting from the additional steps beyond centrifugation that make this a less desirable option for manufacturing.

Furthermore, while these extraction processes may be conducted in small batch, scaling up to process large quantities of grain in industrial amounts and volumes to create an economically viable product (both quality wise and quantity wise) is a challenge. For example, processing of groats require large energy investment. Product loss is also common because the components (e.g., oat bran and other large particles) that contaminate the flavor and potability of the resulting extract must be separated out from the final product. Handling of large volumes for processes such as centrifugation frequently results in retentate liquid to avoid carryover of the separated product. Lastly, the efficiency of enzymatic and/or mechanical processes of large quantities of groat and/or groat suspended in large volumes is not universally scalable.

Thus, variables such as expensive raw materials, time and energy intensive pretreatments and posttreatments such as soaking, blanching, and peeling, as well as thermal sterilization, can impede the sustainability, affordability, and widespread adoption of plant-based beverages. Accordingly, improved methods and systems are needed for optimizing beverage production processes to generate a product (e.g., oat milk) of desirable quality that recognize, take into account, and/or address one or more of the issues described above.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical and appropriate, similar reference numbers denote similar structures, features, or elements.

Figure 1:
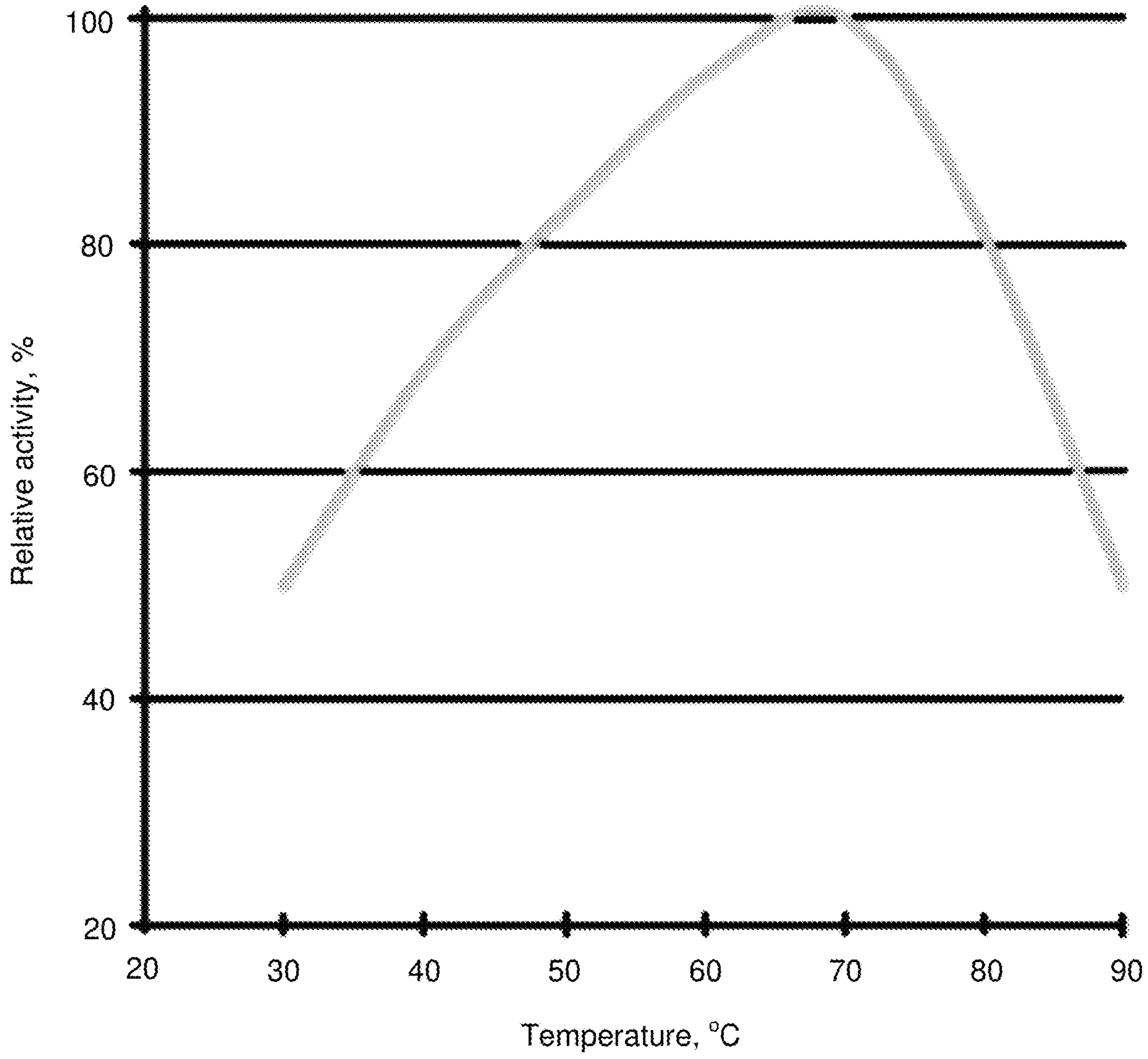
FIG. 1 shows a chart indicating a relative activity % change of the enzyme BAN480L over temperature change according to certain embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

SUMMARY

Provided herein is a method of reducing particle size distribution in a beverage product, the method comprising: soaking a plurality of groats in water at a soaking temperature at a soaking start point to produce a groat-water mixture; adding an enzyme to the groat-water mixture to produce a groat-water-enzyme mixture, for a predetermined amount of soaking time; wherein the predetermined amount of soaking time is determined by calculating an amount of soaking time needed in order for the soaking temperature at the soaking time point to reach an optimized average soaking temperature; transferring the groat-water-enzyme mixture to a cavitation vessel, to undergo an enhanced combination cavitation process; wherein the process comprises a cavitation step and a liquefaction step; and wherein the cavitation step is conducted at an optimized cavitation temperature, and the liquefaction step is conducted for an optimized liquefaction time. In some embodiments, groat-water mixture has a ratio of 1:0 to 1:10. In some embodiments, the plurality of groats are a plurality of oat groats. In some embodiments, the optimized average soaking temperature is between 10-15° C. In some embodiments, the optimized cavitation temperature is between 65-70° C. In some embodiments, the optimized liquefaction time is between 40-50 minutes. In some embodiments, the optimized average soaking temperature, optimized cavitation temperature, and optimized liquefaction time are determined by optimizing particle size distribution, solid content percentage, and viscosity of the beverage product. In some embodiments, the optimized cavitation temperature is determined at least in part by the relative enzyme activity of the enzyme at a given cavitation temperature. In some embodiments, the groat-water-enzyme mixture has a particle size distribution (D90 particle size) of less than about 600 microns after undergoing the process.

Provided herein is a method of making a volume of a groat extract, the method comprising: adding water to an amount of groat to produce a groat-water mixture; soaking the groat-water mixture at a soaking temperature; and subjecting the groat-water mixture to a process to produce a groat extract. In some embodiments, the soaking temperature is between 10-15° C. In some embodiments, an amount of enzyme is added to the groat-water mixture. In some embodiments, the enzyme is added to the groat-water mixture before subjecting the groat-water mixture to the process to produce a groat extract. In some embodiments, the amount of enzyme is 0.2% w/w or more of enzyme to groats. In some embodiments, the amount of enzyme is 0.2% w/w enzyme to groats. In some embodiments, the enzyme is an amylase enzyme. In some embodiments, the amylase enzyme is an alpha-amylase. In some embodiments, the alpha-amylase is BAN480L. In some embodiments, the process comprises a cavitation step. In some embodiments, the length of the cavitation step is determined by a temperature increasing stage. In some embodiments, the process comprises a liquefaction step. In some embodiments, the liquefaction step is about 30 minutes or longer. In some embodiments, the liquefaction step is about 40 minutes or longer. In some embodiments, the liquefaction step is about 50 minutes or longer. In some embodiments, the liquefaction step is between 30 to 50 minutes. In some embodiments, the liquefaction step is between 30 to 40 minutes. In some embodiments, the liquefaction step is between 40 to 50 minutes. In some embodiments, the liquefaction step is conducted at a liquefaction temperature. In some embodiments, the liquefaction temperature is between 65-70° C. In some embodiments, the length of the cavitation step is determined by the liquefaction temperature. In some embodiments, the method comprises an enzyme inactivation step. In some embodiments, the enzyme inactivation step comprises incubating the groat-water mixture at 95° C. In some embodiments, the volume of the groat-water mixture is at least 100 liters. In some embodiments, the volume of the groat-water mixture is at least 200 liters. In some embodiments, the amount of groat is at least 2 kg. In some embodiments, the amount of groat is at least 2.5 kg. In some embodiments, the amount of groat is at least 10 kg. In some embodiments, the amount of groat is at least 20 kg. In some embodiments, the amount of groat is at least 30 kg. In some embodiments, the amount of groat is at least 40 kg. In some embodiments, the amount of groat is about 55 kg. In some embodiments, the amount of groat is more than 55 kg. In some embodiments, the amount of groat is about 100 kg. In some embodiments, the amount of groat is about 150 kg or more. In some embodiments, the amount of groat is about 165 kg. In some embodiments, the groat-water mixture is a ratio of about 1:1 w/w to about 1:10 w/w water to groat. In some embodiments, the method does not comprise a stone milling and/or hammer milling step. In some embodiments, the method comprises increasing the ratio of the groat-water mixture by adding a volume of a liquid to the groat-water mixture prior to the cavitation step to arrive at a cavitation ratio. In some embodiments, the liquid is water. In some embodiments, the cavitation ratio is about 1 kg groats to 2 L water. In some embodiments, the volume of the process is about 400 L or more. In some embodiments, the volume of the process is about 500 L. In some embodiments, the volume of the process is 400 L. In some embodiments, the volume of the process is 500 L. In some embodiments, the groat extract is further subjected to a decantation step. In some embodiments, the groat extract is substantially free of bran particles. In some embodiments, the groat is oat groat. In some embodiments, the groat extract is further diluted for oat milk.

In some embodiments, the groat extract is characterized by a D90 of about 600 microns or less. In some embodiments, the groat extract is characterized by a D90 of about 500 microns or less. In some embodiments, the groat extract is characterized by a D90 of about 400 microns or less. In some embodiments, the groat extract is characterized by a D90 of about 350 microns or less. In some embodiments, the groat extract is characterized by a D90 of about 320 microns or less. In some embodiments, the groat extract is characterized by a D90 of about 320 microns. In some embodiments, the groat extract is characterized by a D90 of about 150 microns or less. In some embodiments, the groat extract is characterized by a D90 of about 25 microns or less. In some embodiments, the groat extract is characterized by a D90 of about 21 microns. In some embodiments, the groat extract is characterized by a D90 of about 20 microns. In some embodiments, the groat extract is characterized by a D90 of about 19 microns. In some embodiments, the groat extract is characterized by a D90 of about 18 microns. In some embodiments, the groat extract is characterized by a D90 of about 17 microns. In some embodiments, the groat extract is characterized by a D90 of 150 microns or less.

In some embodiments, the extract is decanted. In some embodiments, the groat extract is characterized by a D90 of about 150 microns. In some embodiments, the groat extract is characterized by a D90 of about 135 microns. In some embodiments, the groat extract is characterized by a D90 of about 125 microns. In some embodiments, the groat extract is characterized by a D90 of about 110 microns. In some embodiments, the groat extract is characterized by a D90 of about 100 microns. In some embodiments, the groat extract is characterized by a D90 of about 75 microns. In some embodiments, the groat extract is characterized by a D90 of about 50 microns. In some embodiments, the groat extract is characterized by a D90 of about 25 microns or less. In some embodiments, the groat extract is characterized by a D90 of about 21 microns. In some embodiments, the groat extract is characterized by a D90 of about 20 microns. In some embodiments, the groat extract is characterized by a D90 of about 19 microns. In some embodiments, the groat extract is characterized by a D90 of about 18 microns. In some embodiments, the groat extract is characterized by a D90 of about 17 microns. In some embodiments, the groat extract is characterized by a D90 of 150 microns. In some embodiments, the groat extract is characterized by a D90 of 135 microns. In some embodiments, the groat extract is characterized by a D90 of 125 microns. In some embodiments, the groat extract is characterized by a D90 of 110 microns. In some embodiments, the groat extract is characterized by a D90 of 100 microns. In some embodiments, the groat extract is characterized by a D90 of 75 microns. In some embodiments, the groat extract is characterized by a D90 of 50 microns. In some embodiments, the groat extract is characterized by a D90 of 25 microns or less. In some embodiments, the groat extract is characterized by a D90 of 21 microns. In some embodiments, the groat extract is characterized by a D90 of 20 microns. In some embodiments, the groat extract is characterized by a D90 of 19 microns. In some embodiments, the groat extract is characterized by a D90 of 18 microns. In some embodiments, the groat extract is characterized by a D90 of 17 microns. In some embodiments, the methods described herein comprise a decanter step after the liquefaction step.

DETAILED DESCRIPTION

Overview

A detailed description of one or more embodiments of the invention is provided below along with accompanying figures that illustrate the principles of the invention. The invention is described in connection with such embodiments, but the invention is not limited to any embodiment. The scope of the invention is limited only by the claims. Numerous specific details are set forth in the following description in order to provide a thorough understanding of the invention. These details are provided for the purpose of non-limiting examples and the invention may be practiced according to the claims without some or all of these specific details. For the purpose of clarity, technical material that is known in the technical fields related to the invention has not been described in detail so that the invention is not unnecessarily obscured.

The present disclosure is related to methods of producing groat extracts and a plant-based beverage based on an enhanced combination cavitation process (e.g., a process).

Thus, the embodiments described herein improve one or more technical fields, such as for example, the technical field of plant-based beverage production. For example, the embodiments described herein improve the technical field of plant-based beverage production by providing enhanced product quality—compared to conventional methods—with respect to homogenization of the plant-based beverage product. This example improvement is due to the described embodiments providing a technical solution (e.g., reducing particle size, improving particle solubility, and incorporating hydrocolloids and emulsifiers to a technical problem (e.g., reduced homogeneity of plant-based beverage products compared with bovine beverage products).

In some embodiments, the embodiments described herein include an unconventional combination of steps that results in improvements to the technical field of plant-based beverage production. For example, the combination of steps associated with the use of improved cavitation techniques (e.g., the enhanced combination cavitation process or the process) is associated with plant-based beverage production of enhanced quality with respect to homogeneity.

Detailed Description of Aspects and Embodiments of the Disclosure

Plant-Based Beverages

Plant-based beverages, recognized for their nutritional benefits, are increasingly preferred by consumers in the nonalcoholic beverage market. Types of plant-based beverages include, for example, almond milk, soy milk, and oat milk. Plant-based beverages are made by extracting and separating the water-soluble portion from the groat (e.g., groat extract).

Oat milk stands out as a highly nutritious option among plant-based beverages. With low fat content, it surpasses bovine milk in calcium per serving, while also serving as a rich source of Vitamin A and iron. A single serving of oat beverage can provide 36% of the recommended daily calcium intake, exceeding the 28% offered by whole milk.

Due to the disintegration of plant materials in oat beverage production, the resulting particle sizes can exhibit less uniformity compared to bovine milk, owing to differences in lipid and protein molecules.

Another variable posed by the natural composition of oats is their high starch content. Starch is one of the main components in grains such as oats. Oats, with generally about 12-20% of proteins by weight, is a potentially valuable source for food industry and can be used as an additive in a variety of food products such as beverages, meat, etc. Today, the interest in replacing the expensive and limited dietary proteins with a cheap source of protein from plants is increasing due to the increasing world population.

Relatively high starch content of oats (50%-60%) is challenging during ultra-high heat treatments because of starch's relatively low gelatinization temperature. To control this variable, producers use an enzymatic hydrolysis of starch based on enzymes such as alpha-amylase and beta-amylase.

I. Methods of Making Groat Extract

Existing methods may initiate with physical methods to disrupt the groat (e.g., oat groat) such as using milling techniques to grind the groats, followed by the addition of enzymes to break down the starches (e.g., oat starches) into smaller components. As a non-limiting example, beverages such as oat milk are made from groat extract. For oat milk, which is made from oat groats extract, the oat groats comprise the oat bran, the oat endosperm, and the oat germ. While nutritious, the oat bran imparts a bitter taste and is often removed from the final oat milk product. The bran is then separated from the oats, leaving loose fibers. Depending on the desired product, additional flavorings and ingredients, such as vitamins, may be incorporated into the diluted groat extract to arrive at the beverage. Subsequently, the beverage undergoes sterilization before packaging.

Enzymes play a key role in catalyzing biological reactions. As a result, they are often active under relatively mild conditions and their catalysis can be highly specific. Due to these characteristics, enzymes are increasingly being used in modern biotechnological settings, such as the food, biofuel and fine chemical industries.

The process of enzymatic starch hydrolysis may involve liquefaction. In liquefaction processes (e.g., liquefaction steps), starch is gelatinized and treated by an enzyme, such as alpha-amylase and beta-amylase, which fragments the starch into regularly sized chains, resulting in products such as dextrin, maltose, maltotriose and maltopentaose.

Provided herein are methods of making a volume of a groat extract, the method comprising adding water to an amount of groat in water to produce a groat-water mixture, soaking the groat-water mixture at a soaking temperature; and subjecting the groat-water mixture to a process to produce a groat extract. Also provided herein are methods of making a volume of a groat extract, the method comprising adding water and an enzyme to an amount of groat in water to produce a groat-water-enzyme mixture, soaking the groat-water mixture at a soaking temperature; and subjecting the groat-water-enzyme mixture to a process to produce a groat extract, wherein the process comprises a cavitation step at a cavitation temperature (e.g., an optimized cavitation temperature), and a liquefaction step at a liquefaction temperature (e.g., an optimized liquefaction temperature). Also provided herein are methods of making a volume of a groat extract, the method comprising adding water and an enzyme to an amount of groat in water to produce a groat-water-enzyme mixture, soaking the groat-water mixture at a soaking temperature; and subjecting the groat-water-enzyme mixture to a process to produce a groat extract, wherein the process comprises a cavitation step at a cavitation temperature (e.g., an optimized cavitation temperature), and a liquefaction step at a liquefaction temperature (e.g., an optimized liquefaction temperature) for an optimized liquefaction time.

Provided herein are also methods of reducing particle size distribution in a beverage product, the method comprising: soaking a plurality of groats in water at a soaking temperature at a soaking start point to produce a groat-water mixture, adding an amylase enzyme to the groat-water mixture to produce a groat-water-enzyme mixture, for a predetermined amount of soaking time, wherein the predetermined amount of soaking time is determined by calculating an amount of soaking time needed in order for the soaking temperature at the soaking time point to reach an optimized average soaking temperature, transferring the groat-water-enzyme mixture to a cavitation vessel, to undergo a process, wherein the process comprises a cavitation step and a liquefaction step; and wherein the cavitation step is conducted at an optimized cavitation temperature, and the liquefaction step is conducted for an optimized liquefaction time.

In some embodiments, the groat is oat groat. In some embodiments, the methods described herein do not comprise a milling step that grinds (e.g., mechanically crushes) the groat. In some embodiments, the cavitation step is prior to the liquefaction step. In some embodiments, the cavitation step is conducted at a cavitation temperature. In some embodiments, the liquefaction step is conducted at a liquefaction temperature.

In some embodiments, the groat-water mixture is subject to a process after preparation according to any of the methods described herein, wherein the process comprises a cavitation step and a liquefaction step. In some embodiments the groat-water mixture comprises an enzyme, forming a groat-water-enzyme mixture. In some embodiments the enzyme is an alpha-amylase. In some embodiments the alpha-amylase is BAN480L.

In some embodiments, the methods described herein may be controlled by varying the temperature during the process. In some embodiments, various factors can be considered in controlling the temperatures, such as temperature change over a period of time, temperature levels such as starting temperature and peak temperature, holding time or duration at a controlled temperature level, etc. For example, the temperature change rate over time, temperature levels, and holding time or duration at a controlled temperature level can be based on relative activity of an enzyme or enzyme denaturation.

In some embodiments, in the beginning of the process, the starting temperature can be from about 10° C. to about 60° C. In some embodiments, the starting temperature can be from about 10° C. to about 55° C. In some embodiments, the starting temperature can be from about 10° C. to about 50° C. In some embodiments, the starting temperature can be from about 15° C. to about 45° C. In some embodiments, the starting temperature can be from about 20° C. to about 40° C. In some embodiments, the starting temperature can be from about 20° C. to about 30° C. In some embodiments, the starting temperature can be from about 22° C. to about 28° C.

In some embodiments, during the temperature increasing stage of the process, the temperature can change at or around an average rate of about 0.2° C. per minute, about 0.5° C. per minute, about 0.7° C. per minute, about 1° C. per minute, about 1.2° C. per minute, about 1.5° C. per minute, about 2° C. per minute, about 2.5° C. per minute, about 3° C. per minute, about 4° C. per minute, about 5° C. per minute, about 6° C. per minute, about 7° C. per minute, about 8° C. per minute, about 9° C. per minute, about 10° C. per minute, about 15° C. per minute, etc. In some embodiments, during the temperature increasing stage of the process, the temperature can change at or around a rate of from about 0.2° C. per minute to about 15° C. per minute. In some embodiments, during the temperature increasing stage of the process, the temperature can change at or around a rate of from about 0.3° C. per minute to about 10° C. per minute. In some embodiments, during the temperature increasing stage of the process, the temperature can change at or around a rate of from about 0.4° C. per minute to about 8° C. per minute. In some embodiments, during the temperature increasing stage of the process, the temperature can change at or around a rate of from about 0.5° C. per minute to about 5° C. per minute. In some embodiments, during the temperature increasing stage of the process, the temperature can change at or around a rate of from about 0.7° C. per minute to about 2° C. per minute.

In some embodiments, the process comprises a temperature holding period, for example, as a main period for liquefaction by an enzyme such as a liquefaction step. The temperature holding period as the main period for liquefaction by an enzyme can be substantially less than about 90 minutes. For example, in some embodiments, the temperature holding period can be less than about 80 minutes. In some embodiments, the temperature holding period can be less than 60 minutes. In some embodiments, the temperature holding period can be less than 50 minutes. In some embodiments, the temperature holding period can be less than 40 minutes. In some embodiments, the temperature holding period can be less than 30 minutes. In some embodiments, the temperature holding period can be less than 20 minutes. In some embodiments, the temperature holding period can be from about 10 minutes to about 20 minutes, such as about 12 minutes, about 13 minutes, about 14 minutes, about 15 minutes, about 16 minutes, about 17 minutes, about 18 minutes, or about 19 minutes.

In some embodiments, the temperature during the temperature holding period can be substantially less than about 85° C. For example, in some embodiments, the temperature during the temperature holding period can be less than about 80° C. In some embodiments, the temperature during the temperature holding period can be less than about 78° C. In some embodiments, the temperature during the temperature holding period can be less than about 77° C. In some embodiments, the temperature during the temperature holding period can be from about 80° C. less than about 75° C. In some embodiments, the temperature during the temperature holding period can be from about 60° C. to about 80° C. In some embodiments, the temperature during the temperature holding period can be from about 65° C. to about 75° C. In some embodiments, the temperature during the temperature holding period can be about 66° C., about 67° C., about 68° C., about 69° C., about 70° C., about 71° C., about 72° C., about 73° C., about 74° C., etc.

In some embodiments, a cavitation pump could be operated continuously until a predetermined holding temperature of from about 65° C. to about 75° C., for the enzymatic process is reached inside the cavitation vessel. The precise temperature control afforded by the cavitation approach can be one of the main elements to be controlled. Following reaching the predetermined temperature, predetermined holding temperature can be maintained. For example, holding the predetermined temperature from about 65° C. to about 75° C. for a predetermined time of, for example, 30 minutes, 20 minutes, or 15 minutes, by intermittently pulsing the cavitation pump. The cavitation pump can provide the velocity and pressure for creating the desired process in the cavitation apparatus, for example, to mill the groats (e.g., oat groats) feedstock and heat the contents of the cavitation vessel.

a. Viscosity

In some embodiments, the groat extract (e.g., oat extract or oat concentrate) produced by the methods described herein or the beverages (e.g., oat milk) diluted from the groat extract produced the methods described herein may be characterized by low product viscosity and exhibits shear thinning properties. Product viscosity can be determined by factors such as processing conditions and particles in the product. Viscosity can be measured, for example, by using a viscometer to measure the viscosity of the extracts produced by the methods described herein. Viscometers can be used to measure the apparent viscosity of a fluid (e.g., an extract such as groat extract) at various temperatures and time periods.

In some embodiments, the viscosity of the extract (e.g., groat extract) decreases after a decanter step. In some embodiments, the viscosity of the extract (e.g., groat extract) is lower after a decanter step compared to the viscosity of the extract prior to the decanter step.

In some embodiments, the viscosity is measured using a viscometer at the selected values of 25 minutes of time, at a temperature of 20° C., and at a speed of 50 rpm. In some embodiments, the viscosity of the extract is about 180 centipoise (cP) to about 670 cP. In some embodiments, the viscosity of the extract is about 140 centipoise to about 155 cP. In some embodiments, the viscosity of the extract is about 143 cP, about 144 cP, about 145 cP, about 149 cP, about 152 cP, about 153 cP, about 180 cP, about 225 cP, about 350 cP, about 375 cP, about 440 cP, about 460 cP, or about 676 cP. In some embodiments, the viscosity of the extract is about 143.6 cP, about 143.7 cP, about 144.1 cP, about 144.2 cP, about 144.5 cP, about 144.8 cP, or about 145 cP. In some embodiments, the viscosity of the extract is about 152 cP or less, about 150 cP or less, about 148 cP or less, about 145 cP or less, about 144 cP or less, or about 143 cP or less.

In some embodiments, the viscosity is measured using a viscometer at the selected values of 20 minutes of time, at a temperature of 20° C., and at a speed of 50 rpm. In some embodiments, the viscosity of the extract is about 180 cP to about 685 cP. In some embodiments, the viscosity of the extract is about 190 cP, 191 cP, about 200 cP, about 225 cP, about 250 cP, about 275 cP, about 290 cP, about 300 cP, about 325 cP, about 356 cP, about 375 cP, about 381 cP, about 400 cP, about 425 cP, about 448 cP, about 450 cP, about 471 cP, about 475 cP, about 500 cP, about 525 cP, about 550 cP, about 600 cP, about 650 cP, or about 683 cP.

In some embodiments, the viscosity is measured using a viscometer at the selected values of 15 minutes of time, at a temperature of 20° C., and at a speed of 50 rpm. In some embodiments, the viscosity of the extract is about 180 cP to about 690 cP. In some embodiments, the viscosity of the extract is about 201 cP, about 230 cP, about 294 cP, about 369 cP, about 391 cP, about 462 cP, about 476 cP, or about 690 cP.

In some embodiments, the viscosity is measured using a viscometer at the selected values of 10 minutes of time, at a temperature of 20° C., and at a speed of 50 rpm. In some embodiments, the viscosity of the extract is about 208 cP to about 706 cP. In some embodiments, the viscosity of the extract is about 208 cP, about 225 cP, about 235 cP, about 250 cP, about 275 cP, about 294 cP, about 300 cP, about 325 cP, about 350 cP, about 374 cP, about 400 cP, about 404 cP, about 425 cP, about 450 cP, about 474 cP, about 481 cP, about 500 cP, about 550 cP, about 575 cP, about 600 cP, about 625 cP, about 650 cP, about 700 cP, or about 706 cP.

In some embodiments, the viscosity is measured using a viscometer at the selected values of 5 minutes of time, at a temperature of 20° C., and at a speed of 50 rpm. In some embodiments, the viscosity of the extract is about 220 cP to about 721 cP. In some embodiments, the viscosity of the extract is about 220 cP, about 230 cP, about 242 cP, about 250 cP, about 275 cP, about 301 cP, about 325 cP, about 350 cP, about 375 cP, about 386 cP, about 400 cP, about 422 cP, about 450 cP, about 475 cP, about 493 cP, about 494 cP, about 500 cP, about 550 cP, about 600 cP, about 700 cP, or about 721 cP.

In some embodiments, the viscosity is measured using a viscometer at the selected values of 25 minutes of time, at a temperature of 20° C., and at a speed of 20 rpm. In some embodiments, the viscosity of the extract is about 300 cP to about 1254 cP. In some embodiments, the viscosity of the extract is about 300 cP, about 325 cP, about 358 cP, about 375 cP, about 400 cP, about 425 cP, about 450 cP, about 475 cP, about 500 cP, about 525 cP, about 536 cP, about 540 cP, about 500 cP, about 525 cP, about 550 cP, about 575 cP, about 600 cP, about 625 cP, about 650 cP, about 675 cP, about 700 cP, about 712 cP, about 716 cP, about 725 cP, about 750 cP, about 775 cP, about 800 cP, about 825 cP, about 840 cP, about 850 cP, about 875 cP, about 900 cP, about 925 cP, about 950 cP, about 975 cP, about 1000 cP, about 1050 cP, about 1100 cP, about 1150 cP, about 1200 cP, or about 1254 cP.

In some embodiments, the viscosity is measured using a viscometer at the selected values of 20 minutes of time, at a temperature of 20° C., and at a speed of 20 rpm. In some embodiments, the viscosity of the extract is about 322 cP to about 1268 cP. In some embodiments, the viscosity of the extract is about 322 cP, about 368 cP, about 400 cP, about 425 cP, about 450 cP, about 475 cP, about 500 cP, about 525 cP, about 540 cP, about 548 cP, about 575 cP, about 600 cP, about 625 cP, about 650 cP, about 700 cP, about 732 cP, about 750 cP, about 800 cP, about 850 cP, or about 1268 cP.

In some embodiments, the viscosity is measured using a viscometer at the selected values of 15 minutes of time, at a temperature of 20° C., and at a speed of 20 rpm. In some embodiments, the viscosity of the extract is about 348 cP to about 1294 cP. In some embodiments, the viscosity of the extract is about 348 cP, about 384 cP, about 400 cP, about 425 cP, about 450 cP, about 475 cP, about 500 cP, about 525 cP, about 542 cP, about 560 cP, about 575 cP, about 600 cP, about 625 cP, about 650 cP, about 675 cP, about 700 cP, about 725 cP, about 750 cP, about 752 cP, about 800 cP, about 860 cP, about 900 cP, about 925 cP, about 950 cP, about 975 cP, about 1000 cP, about 1050 cP, about 1100 cP, about 1125 cP, about 1150 cP, about 1200 cP, about 1250 cP, about 1275 cP, or about 1294 cP.

In some embodiments, the viscosity is measured using a viscometer at the selected values of 10 minutes of time, at a temperature of 20° C., and at a speed of 20 rpm. In some embodiments, the viscosity of the extract is about 374 cP to about 1316 cP. In some embodiments, the viscosity of the extract is about 374 cP, about 404 cP, about 450 cP, about 500 cP, about 525 cP, about 542 cP, about 574 cP, about 600 cP, about 625 cP, about 650 cP, about 700 cP, about 725 cP, about 750 cP, about 766 cP, about 770 cP, about 800 cP, about 825 cP, about 850 cP, about 878 cP, about 900 cP, about 925 cP, about 950 cP, about 1000 cP, about 1050 cP, about 1100 cP, about 1150 cP, about 1200 cP, about 1250 cP, about 1300 cP, or about 1316 cP In some embodiments, the viscosity is measured using a viscometer at the selected values of 5 minutes of time, at a temperature of 20° C., and at a speed of 20 rpm. In some embodiments, the viscosity of the extract is about 404 cP to about 1344 cP. In some embodiments, the viscosity of the extract is about 404 cP, about 412 cP, about 450 cP, about 475 cP, about 500 cP, about 525 cP, about 548 cP, about 575 cP, about 592 cP, about 625 cP, about 650 cP, about 700 cP, about 750 cP, about 796 cP, about 850 cP, about 902 cP, about 950 cP, about 1000 cP, about 1150 cP, about 1200 cP, about 1250 cP, about 1300, or about 1344 cP.

In some embodiments, the viscosity is measured using a viscometer at the selected values of 25 minutes of time, at a temperature of 20° C., and at a speed of 10 rpm. In some embodiments, the viscosity of the extract is about 564 cP to about 2280 cP. In some embodiments, the viscosity of the extract is about 564 cP, about 600 cP, about 650 cP, about 700 cP, about 740 cP, about 775 cP, about 800 cP, about 836 cP, about 900 cP, about 950 cP, about 1000 cP, about 1100 cP, about 1128 cP, about 1320 cP, about 1400 cP, about 1428 cP, about 1500 cP, about 1575 cP, about 1600 cP, about 1650 cP, about 1700 cP, about 1750 cP, about 1800 cP, about 1850 cP, about 1900 cP, about 1950 cP, about 2000 cP, about 2100 cP, about or about 2280 cP.

In some embodiments, the viscosity is measured using a viscometer at the selected values of 20 minutes of time, at a temperature of 20° C., and at a speed of 10 rpm. In some embodiments, the viscosity of the extract is about 604 cP to about 2320 cP. In some embodiments, the viscosity of the extract is about 604 cP, about 650 cP, about 700 cP, about 740 cP, about 775 cP, about 800 cP, about 836 cP, about 850 cP, about 900 cP, about 950 cP, about 975 cP, about 1000 cP, about 1100 cP, about 1148 cP, about 1200 cP, about 1300 cP, about 1380 cP, about 1400 cP, about 1440 cP, about 1500 cP, about 1550 cP, about 1600 cP, about 1650 cP, about 1700 cP, about 1750 cP, about 1800 cP, about 1850 cP, about 1900 cP, about 1950 cP, about 2000 cP, about 2050 cP, about 2100 cP, about 2150 cP, about 2200 cP, about 2250 cP, about 2300 cP, or about 2320 cP.

In some embodiments, the viscosity is measured using a viscometer at the selected values of 15 minutes of time, at a temperature of 20° C., and at a speed of 10 rpm. In some embodiments, the viscosity of the extract is about 640 cP to about 2380 cP. In some embodiments, the viscosity of the extract is about 640 cP, about 650 cP, about 675 cP, about 700 cP, about 750 cP, about 776 cP, about 800 cP, about 880 cP, about 904 cP, about 950 cP, about 1000 cP, about 1050 cP, about 1100 cP, about 1172 cP, about 1300 cP, about 1350 cP, about 1400 cP, about 1448 cP, about 1464 cP, about 1500 cP, about 1600 cP, about 1700 cP, about 1800 cP, about 1900 cP, about 2000 cP, about 2100 cP, about 2200 cP, about 2300 cP, or about 2380 cP.

In some embodiments, the viscosity is measured using a viscometer at the selected values of 10 minutes of time, at a temperature of 20° C., and at a speed of 10 rpm. In some embodiments, the viscosity of the extract is about 700 cP to about 2460 cP. In some embodiments, the viscosity of the extract is about 700 cP, about 750 cP, about 820 cP, about 850 cP, about 908 cP, about 916 cP, about 950 cP, about 1000 cP, about 1100 cP, about 1200 cP, about 1208 cP, about 1300 cP, about 1400 cP, about 1496 cP, about 1500 cP, about 1560 cP, about 1600 cP, about 1700 cP, about 1800 cP, about 1900 cP, about 2000 cP, about 2100 cP, about 2200 cP, about 2300 cP, or about 2460 cP.

In some embodiments, the viscosity is measured using a viscometer at the selected values of 5 minutes of time, at a temperature of 20° C., and at a speed of 10 rpm. In some embodiments, the viscosity of the extract is about 972 cP to about 2588 cP. In some embodiments, the viscosity of the extract is about 972 cP, about 1020 cP, about 1044 cP, about 1100 cP, about 1200 cP, about 1300 cP, about 1400 cP, about 1500 cP, about 1600 cP, about 1700 cP, about 1780 cP, about 1800 cP, about 1900 cP, about 2000 cP, about 2100 cP, about 2276 cP, about 2300 cP, about 2400 cP, about 2500 cP, about 2600 cP, about 2700 cP, about 2800 cP, or about 2820 cP.

b. Solid Content Percentage and Methods of Measuring Thereof

Solid content percentage (or total solid percentage) represents the proportion of solid (e.g., non-liquid) components present and may be measured by techniques known in the art, such as gravimetric analysis. Solid content percentage/total content percentage may be determined by evaporating the liquid portion by heating and measuring the weight of the sample that remains on the heating foil (the solid portion of the sample). An example of gravimetric analysis is the forced air oven drying method, performed according to Association of Official Agricultural Chemists (AOAC) 990.20. The ratio of remaining solid to the initial weight of added sample is called solid content percentage (or total solid percentage, which is calculated by TS (%)=((Dry residue weight÷Sample weight)×100). In some embodiments, the extracts produced by the methods described herein or the beverages (e.g., oat milk) diluted from the extracts produced by the methods described herein comprise a low solid content percentage. In some embodiments, the solid content percentage is about 24 to about 29. In some embodiments, the solid content percentage is about 20, about 22, about 24, about 25, about 26, about 28, or about 30. In some embodiments, the solid content percentage is about 25.1, about 25.2, about 25.3, about 25.4, about 25.5, about 25.6, about 25.7, about 25.8, about 25.9, or about 26. In some embodiments, the extracts produced by the methods described herein or the beverages (e.g., oat milk) diluted from the extracts produced by the methods described herein are substantially free of bran particles after a decanter step. In some embodiments, the extracts produced by the methods described herein or the beverages (e.g., oat milk) diluted from the extracts produced by the methods described herein do not comprise bran particles after a decanter step. In some embodiments, the extracts produced by the methods described herein or the beverages (e.g., oat milk) diluted from the extracts produced by the methods described herein are mixed with a shear mixer.

In some embodiments, the extracts produced by the methods described herein or the beverages (e.g., oat milk) diluted from the extracts produced by the methods described herein may be characterized by a D90 value. In some embodiments, the D90 value is about 700 microns or less, about 600 microns or less, about 500 microns or less, about 400 microns or less, about 300 microns or less, about 200 microns or less, about 100 microns or less, about 30 microns or less, about 25 microns or less, about 24 microns or less, about 21 microns or less, about 20 microns or less, about 19 microns or less, about 18 microns or less, or about 17 microns or less. In some embodiments, the D90 value is between about 15 microns to about 750 microns. In some embodiments, the D90 value is between about 15 microns to about 150 microns. In some embodiments, the D90 value is between about 25 microns to about 150 microns. In some embodiments, the D90 value is about 17 microns, about 18 microns, about 19 microns, about 20 microns, about 21 microns, about 22 microns, about 150 microns, about 330 micros, about 380 microns, about 390 microns, about 400 microns, about 420 microns, about 430 microns, about 440 microns, about 450 microns, about 500 microns, about 525 microns, about 600 microns, about 625 microns, about 650 microns, or about 700 microns.

In some embodiments, the extract is not subject to a decanter step (e.g., the extract is not decanted). A D90 of about 600 microns or less may be observed for extract that has been processed by the methods described herein, but has not yet been decanted. In some embodiments, the extracts produced by the methods described herein or the beverages (e.g., oat milk) diluted from the extracts produced by the methods described herein are characterized by having a D90 of about 600 microns or less. In some embodiments, the extracts produced by the methods described herein or the beverages (e.g., oat milk) diluted from the extracts produced by the methods described herein are characterized by having a D90 of about 450 microns or less. In some embodiments, the extracts produced by the methods described herein or the beverages (e.g., oat milk) diluted from the extracts produced by the methods described herein are characterized by having a D90 of about 350 microns or less. In some embodiments, the extracts produced by the methods described herein or the beverages (e.g., oat milk) diluted from the extracts produced by the methods described herein are characterized by having a D90 of 600 microns or less. In some embodiments, the extracts produced by the methods described herein or the beverages (e.g., oat milk) diluted from the extracts produced by the methods described herein are characterized by having a D90 of 450 microns or less.

A D90 of about 150 microns or less may be observed for extract that has been processed by the methods described herein and subjected to a decanter step. A decanter step is a separation process (same as centrifugation). It separates the bran part of the groats (e.g., oat groats) from dissolved liquefied portion of it. In some embodiments, the extracts produced by the methods described herein or the beverages (e.g., oat milk) diluted from the extracts produced by the methods described herein are characterized by having a D90 of about 150 or less, about 125 microns or less, about 100 microns or less, about 75 microns or less, about 50 microns or less, or about 25 microns or less. In some embodiments, the extracts produced by the methods described herein or the beverages (e.g., oat milk) diluted from the extracts produced by the methods described herein are characterized by having a D90 of 150 microns or less. In some embodiments, the extracts produced by the methods described herein or the beverages (e.g., oat milk) diluted from the extracts produced by the methods described herein are characterized by having a D90 of 25 microns or less. In some embodiments, the extracts produced by the methods described herein or the beverages (e.g., oat milk) diluted from the extracts produced by the methods described herein are characterized by having a D90 between 17 microns and 22 microns. In some embodiments, the extracts produced by the methods described herein or the beverages (e.g., oat milk) diluted from the extracts produced by the methods described herein are characterized by having a D90 of about 17 microns. In some embodiments, the extracts produced by the methods described herein or the beverages (e.g., oat milk) diluted from the extracts produced by the methods described herein are characterized by having a D90 of about 18 microns. In some embodiments, the extracts produced by the methods described herein or the beverages (e.g., oat milk) diluted from the extracts produced by the methods described herein are characterized by having a D90 of about 19 microns. In some embodiments, the extracts produced by the methods described herein or the beverages (e.g., oat milk) diluted from the extracts produced by the methods described herein are characterized by having a D90 of about 20 microns. In some embodiments, the extracts produced by the methods described herein or the beverages (e.g., oat milk) diluted from the extracts produced by the methods described herein are characterized by having a D90 of about 21 microns.

c. Preparing Groats for Processing.

In some embodiments, oat groats feedstock can be prepared for the process. In some embodiments, the oat groats feedstock to be used could be cleaned as required to remove debris and other materials. Oat groats feedstock could also be soaked in a liquid such as water for a period of time to reach a particular level of moisture content or moisture-based conditioning in advance of further processing to soften the groats. The methods described herein comprise adding water to an amount of groats to produce a groat-water mixture. In some embodiments, the amount of groats is at least 2 kg. In some embodiments, the amount of groats is at least 2.5 kg. In some embodiments, the amount of groats is at least 10 kg. In some embodiments, the amount of groats is at least 20 kg. In some embodiments, the amount of groats is at least 30 kg. In some embodiments, the amount of groats is at least 40 kg. In some embodiments, the amount of groats is at least 55 kg. In some embodiments, the amount of groats is at least 100 kg. In some embodiments, the amount of groats is at least 145 kg. In some embodiments, the amount of groats is at least 150 kg or more. In some embodiments, the amount of groats is at least 165 kg. In some embodiments, the amount of groats is about 2 kg. In some embodiments, the amount of groats is about 2.5 kg. In some embodiments, the amount of groats is about 10 kg. In some embodiments, the amount of groats is about 20 kg. In some embodiments, the amount of groats is about 30 kg. In some embodiments, the amount of groats is about 40 kg. In some embodiments, the amount of groats is about 55 kg. In some embodiments, the amount of groats is more than 55 kg. In some embodiments, the amount of groats is about 100 kg. In some embodiments, the amount of groats is about 145 kg. In some embodiments, the amount of groats is about 150 kg or more. In some embodiments, the amount of groats is about 165 kg. In some embodiments, the amount of groats is 2 kg. In some embodiments, the amount of groats is 2.5 kg. In some embodiments, the amount of groats is 10 kg. In some embodiments, the amount of groats is 20 kg. In some embodiments, the amount of groats is 30 kg. In some embodiments, the amount of groats is 40 kg. In some embodiments, the amount of groats is 55 kg. In some embodiments, the amount of groats is 100 kg. In some embodiments, the amount of groats is 145 kg. In some embodiments, the amount of groats is 150 kg or more. In some embodiments, the amount of groats is 165 kg.

For soaking the groats, such as oat groats, various types of variables can be considered or controlled, including the soaking temperature and soaking time.

i. Soaking Time

In some embodiments, the soaking time can be at least about 30 minutes, to allow minimum time possible for the groats (e.g., oat groats) to be soaked with water. In some embodiments, the soaking time can be about 24 hours or less, as longer soaking time may result in spoilage and involve additional preservation measures such as refrigeration, which can incur additional costs. In some embodiments, the soaking time is 24 hours or less, 20 hours or less, 15 hours or less, 10 hours or less, 5 hours or less, or 2 hours or less. In some embodiments, the soaking time is about 10 hours, about 8 hours, about 6 hours, about 4 hours, about 2 hours, or about 1 hour. In some embodiments, the soaking time is at least 30 minutes, at least 45 minutes, at least 60 minutes, at least 75 minutes, or at least 90 minutes. In some embodiments, the soaking time can be from about 30 minutes to about 60 minutes. In some embodiments, the soaking time is about 15 minutes, about 20 minutes, about 30 minutes, about 40 minutes, about 50 minutes, about 60 minutes, about 70 minutes, about 80 minutes, about 90 minutes, or about 100 minutes. In some embodiments, the soaking time is 15 minutes, 20 minutes, 30 minutes, 40 minutes, 50 minutes, 60 minutes, 70 minutes, 80 minutes, 90 minutes, or 100 minutes. In some embodiments, the soaking time is about 60 minutes. In some embodiments, the soaking time is 60 minutes.

ii. Groat-Water Mixture Ratios or Soaking Ratios

In some embodiments, the starting batch with the soaked groats for the process can have the ratio of groats to water (e.g., groat-water mixture ratio, soaking ratio) from about 1:1 (e.g., about 1 kg groats to about 1 L water) to about 1:10 (e.g., about 1 kg groats to about 10 L water). In some embodiments, the starting batch with the soaked groats for the process can have the ratio of groats to water at from about 1:1 to about 1:8. In some embodiments, the ratio of groats to water is from about 1:2 to about 1:5. In some embodiments, the ratio of groats to water is from about 1:4 to about 1:9. In some embodiments, the ratio of groats to water is from about 1:2 to about 1:7. In some embodiments, the ratio of groats to water is from about 1:5 to about 1:7.5. In some embodiments, the ratio of groats to water is from about 1:1.5 to about 1:2.5. In some embodiments, the ratio of groats to water is from about 1:1.75 to about 1:2.25. In some embodiments, the ratio of groats to water is about 1:2. In some embodiments, the ratio of groats to water is about 1:1.25. In some embodiments, the ratio of groats to water is about 1:1 to about 1:1.3. In some embodiments, the ratio of groats to water is about 1:1.5 to about 1:1.7. In some embodiments, the ratio of groats to water is about 1:1.1 to about 1:1.14. In some embodiments, the ratio of groats to water is about 1:1.2 to about 1:1.3. In some embodiments, the ratio of groats to water is 1:1.25. In some embodiments, the groats are oat groats.

In some embodiments, the ratio of groats (e.g., oat groats) to water is about 55 kg groats to about 68.75 L water. In some embodiments, the ratio of groats (e.g., oat groats) to water is 55 kg groats (e.g., oat groats) to 68.75 L water. In some embodiments, the 55 kg of groats (e.g., oat groats) can be soaked for one hour in 68.75 L of water. In some embodiments, the ratio of groats (e.g., oat groats) to water is about 145 kg groats to about 180 L water. In some embodiments, the ratio of groats (e.g., oat groats) to water is about 145 kg groats to about 181.75 L water. In some embodiments, the ratio of groats (e.g., oat groats) to water is 145 kg groats to 180 L water. In some embodiments, the ratio of groats (e.g., oat groats) to water is 145 kg groats to 181.75 L water. The soaking time of the groats (e.g., oat groats) in the water and enzyme solution may affect particle size and therefore homogeneity of the final beverage product (e.g., oat milk), as discussed herein. In some embodiments, the ratio of groats to water is 1:1.25. In some embodiments, the groats are oat groats.

iii. Soaking Temperature

In some embodiments, the soaking temperature is about 10° C. to about 15° C. In some embodiments, the soaking temperature is about 10° C. to about 12° C. In some embodiments, the soaking temperature is about 11° C. to about 15° C. In some embodiments, the soaking temperature is about 10° C., about 11° C., about 12° C., about 13° C., about 14° C., or about 15° C. In some embodiments, the soaking temperature is about 10° C., about 10.5° C., about 11.5° C., or about 12.25° C. In some embodiments, the soaking temperature is 10° C. In some embodiments, the soaking temperature is 10.5° C. In some embodiments, the soaking temperature is 10.7° C. In some embodiments, the soaking temperature is 10.9° C. In some embodiments, the soaking temperature is 11.1° C. In some embodiments, the soaking temperature is 11° C. In some embodiments, the soaking temperature is 11.6° C. In some embodiments, the soaking temperature is 12° C. In some embodiments, the soaking temperature is 12.1° C.

Once the groats (e.g., oat groats) are sufficiently soaked in water, one or more enzymes may be added to the groats-water mixture, to catalyze biological reactions and further break down the starch (e.g., oat starch). In some embodiments, the enzyme is added during the soaking step. In some embodiments, the enzyme is an alpha-amylase. In some embodiments, the alpha-amylase is BAN480L. In some embodiments, the amount of enzyme to be added to the mixture is determined by an enzyme to groats ratio, which is determined by weight. In some embodiments, the amount of enzyme added is determined as 0.2% w/w or more per kilogram of groats (e.g., oat groats). In some embodiments, the amount of enzyme added is determined as about 0.2% w/w per kilogram of groats (e.g., oat groats). In some embodiments, the amount of enzyme added is determined as 0.2% w/w per kilogram of groats (e.g., oat groats). In some embodiments, 2 grams or more of enzyme is added for every 1 kg of groats (e.g., oat groats). In some embodiments, about 2 grams of enzyme is added for every 1 kg of groats (e.g., oat groats). In some embodiments, 2 grams of enzyme is added for every 1 kg of groats (e.g., oat groats). In some embodiments, 110 g enzyme is used for every 55 kg groats (e.g., oat groats). In some embodiments, the enzyme is an alpha-amylase. In some embodiments, the alpha-amylase is BAN480L.

d. Liquefaction

Liquefaction refers to using enzymes to convert solid or semi-solids into a liquid-like state. Enzymes may break down starches or proteins that regulate properties such as viscosity. In the liquefaction phase, the viscosity of the slurry by an enzymatic cleavage reaction is reduced. The enzyme breaks the long chain starch molecules to smaller chains and that in turn reduces the viscosity. Viscosity reduction is important for downstream processes as it eases the flow of materials in pipes. In some embodiments, the liquefaction step is a step where the enzyme is most active. In some embodiments, the liquefaction step is conducted under conditions where the enzyme is most active. In some embodiments, the liquefaction step is conducted under conditions where the enzyme is most active relative to the other steps in the process, such as the processes described herein.

In some embodiments, the ratio of groats to water is decreased (e.g., ratio of water to groats (e.g., oat groats) is increased; water is added to the groats-water mixture) to reach a cavitation ratio. In some embodiments, the ratio of groats to water is decreased prior to the cavitation step to reach a cavitation ratio. In some embodiments, the groat-water mixture ratio (e.g., ratio of groats to water) is decreased prior to the liquefaction step to reach a cavitation ratio. In some embodiments, the cavitation ratio is expressed as kg groats:L water (e.g., 1 kg groats:1 L water). For example, the groat-water mixture ratio may be 1:1.25 (e.g., 55 kg groats to about 68.75 L water), and the groats-water mixture may be further diluted to reach a cavitation ratio of 1:2 (e.g., 55 kg groats to 110 L water). In some embodiments, the cavitation ratio of groats to water is about 1:1, about 1:1.6, about 1:2, about 1:3, about 1:3.2, about 1:4, about 1:4.8, about 1:5, about 1:6, about 1:6.4, about 1:7, or about 1:8. In some embodiments, the cavitation ratio of groats to water for the liquefaction step is 1:1, is 1:1.6, is 1:2, is 1:3, is 1:3.2, is 1:4, is 1:4.8, is 1:5, is 1:6, is 1:6.4, is 1:7, or is 1:8. In some embodiments, the groats are oat groats.

In some embodiments, the cavitation ratio is about 55 kg groats to about 110 L water. In some embodiments, the cavitation ratio is about 145 kg groats to about 180 L water. In some embodiments, the cavitation ratio is about 145 kg groats to about 181.25 L water. In some embodiments, the cavitation ratio is about 145 kg groats to about 190 L water. In some embodiments, the cavitation ratio is 55 kg groats to 110 L water. In some embodiments, the cavitation ratio is 145 kg groats to 180 L water. In some embodiments, the cavitation ratio is 145 kg groats to 181.25 L water. In some embodiments, the cavitation ratio is 145 kg groats to 190 L water. In some embodiments, the groats are oat groats.

In some embodiments, the cavitation step is executed in a volume of at least 100 L, at least 110 L, at least 200 L, at least 300 L, at least 400 L, or at least 500 L. In some embodiments, the cavitation step is executed in a volume of 110 L. In some embodiments, the cavitation step is executed in a volume of 400 L.

In some embodiments, the liquefaction step is executed in a volume of at least 300 L, at least 400 L, or at least 500 L. In some embodiments, the liquefaction step is executed in a volume of 400 L.

i. Enzymes for Liquefaction

In some embodiments, an enzyme can be one or more of various types of enzymes, which can be, for example, an amylase, such as alpha-amylase and beta-amylase, such as that commercially available under the brand name BAN480L, supplied by Novozymes, or any type of a food grade enzyme capable of the desired digestion or disintegration or other conditioning of the starches within the groats (e.g., oat groats) feedstock. In some embodiments, the enzyme is an amylase. In some embodiments, the amylase is an alpha-amylase. In some embodiments, the alpha-amylase is BAN480L. In some embodiments, one or more enzymes may be used for liquefaction. In some embodiments, the amount of enzyme to be added to the mixture is determined by an enzyme to groat ratio, which is determined by weight. In some embodiments, the amount of enzyme added is determined as 0.2% per kilogram of groats. In some embodiments, 2 grams of enzyme is added for every 1 kg of groat. In some embodiments, 110 grams enzyme is used for every 55 kg groats. In some embodiments, the enzyme is an alpha-amylase. In some embodiments, the alpha-amylase is BAN480L. In some embodiments, the groats are oat groats.

ii. Temperatures for the Liquefaction Step

In some embodiments, the enzyme may have activity rate that can change based on the temperature. For example, FIG. 1 shows a chart indicating a relative activity % change of the enzyme BAN480L over temperature change in some embodiments. Referring to FIG. 1, the relative activity % of BAN480L increases and peaks in between about 60° C. to about 80° C., more specifically in between about 65° C. to about 75° C., in between about 67° C. to about 83° C. In some embodiments, the temperature for liquefaction (e.g., liquefaction temperature) is about 65° C. to about 75° C. In some embodiments, the temperature for liquefaction (e.g., liquefaction temperature) is about 65° C. In some embodiments, the temperature for liquefaction (e.g., liquefaction temperature) is about 66° C. In some embodiments, the temperature for liquefaction (e.g., liquefaction temperature) is about 67° C. In some embodiments, the temperature for liquefaction (e.g., liquefaction temperature) is about 68° C. In some embodiments, the temperature for liquefaction (e.g., liquefaction temperature) is about 69° C. In some embodiments, the temperature for liquefaction (e.g., liquefaction temperature) is about 70° C. In some embodiments, the temperature for liquefaction (e.g., liquefaction temperature) is about 71° C. In some embodiments, the temperature for liquefaction (e.g., liquefaction temperature) is about 72° C. In some embodiments, the temperature for liquefaction (e.g., liquefaction temperature) is about 73° C. In some embodiments, the temperature for liquefaction (e.g., liquefaction temperature) is about 74° C. In some embodiments, the temperature for liquefaction (e.g., liquefaction temperature) is about 75° C. In some embodiments, the temperature for liquefaction (e.g., liquefaction temperature) is 65° C. In some embodiments, the liquefaction step is initiated by raising the temperature of the groat-water mix in the presence of enzyme to the liquefaction temperature (e.g., to about 65° C. to about 75° C.).

iii. Times for the Liquefaction Step

In some embodiments, the liquefaction step executed for about 15 minutes, about 20 minutes, about 30 minutes, about 45 minutes, about 60 minutes, about 80 minutes, or about 90 minutes. In some embodiments, the liquefaction step executed for 90 minutes. In some embodiments, the liquefaction step is executed for about 30 minutes, about 31 minutes, about 32 minutes, about 35 minutes, about 40 minutes, about 41 minutes, about 42 minutes, about 43 minutes, about 44 minutes, about 45 minutes, about 46 minutes, about 47 minutes, about 48 minutes, about 49 minutes, or about 50 minutes. In some embodiments, the liquefaction step executed for about 15 minutes. In some embodiments, the liquefaction step executed for about 30 minutes. In some embodiments, the liquefaction step executed for about 40 minutes. In some embodiments, the liquefaction step executed for about 50 minutes. In some embodiments, the liquefaction step executed for about 90 minutes. In some embodiments, the liquefaction step executed for 15 minutes. In some embodiments, the liquefaction step executed for 30 minutes. In some embodiments, the liquefaction step executed for 40 minutes. In some embodiments, the liquefaction step executed for 50 minutes.

e. Cavitation Step

In some embodiments, the methods disclosed herein utilize a process that comprises a cavitation step that is conducted at a cavitation temperature. In some embodiments, the groats-water-enzyme mixture may then be passed to a cavitation vessel to undergo hydrodynamic cavitation under controlled parameters and/or conditions. Cavitation may occur when the fluid used in the machine undergoes fluctuations in pressure and velocity.

Hydrodynamic cavitation is a type of cavitation that occurs when a low-pressure region is developed in a fluid device and forms vapor cavities. Different types of devices or components, such as pumps, bearings, and propellers can be used to develop cavitation in a liquid. Hydrodynamic cavitation is known as a method used to obtain free disperse systems, particularly diluted suspensions and emulsions. Such free disperse systems are fluidic systems wherein dispersed phase particles have no contacts, participate in random beat motion, and freely move by gravity. Such dispersion and emulsification effects are accomplished within the fluid flow due to cavitation effects produced by a change in geometry of the fluid flow.

In some embodiments, hydrodynamic cavitation processes can be applied to the extraction in water, and of seeds in the form of coarse grains. some embodiments, hydrodynamic cavitation-based processing might achieve a relatively more efficient process by avoiding some of other process or affording fast production cycles.

Hydrodynamic cavitation is the formation of cavities and cavitation bubbles filled with a vapor gas mixture inside the fluid flow or at the boundary of the baffle body resulting from a local pressure drop in the fluid. If during the process of movement of the fluid the pressure at some point decreases to a magnitude under which the fluid reaches a boiling point for this pressure, then a great number of vapor-filled cavities and bubbles are formed. Where these bubbles and cavities are exposed to increased pressure, vapor condensation takes place within the cavities and bubbles, almost instantaneously, causing the cavities and bubbles to collapse, creating very large pressure impulses. The magnitude of the pressure impulses within the collapsing cavities and bubbles may reach 150,000 psi. The result of these high-pressure implosions is the formation of shock waves that emanate from the point of each collapsed bubble. Such high-impact loads can result in the breakup of any medium found near the collapsing bubbles.

A dispersion process can take place when, during cavitation, the collapse of a cavitation bubble near the boundary of the phase separation of a solid particle suspended in a liquid results in the breakup of the suspension particle. An emulsification and homogenization process can take place when, during cavitation, the collapse of a cavitation bubble near the boundary of the phase separation of a liquid suspended or mixed with another liquid results in the breakup of drops of the disperse phase.

In some embodiments, hydrodynamic cavitation is induced by static pressure drops of the flowing liquid. For example, in some embodiments, when the flow passes through constricted parts or irregular geometries, the flow velocity increases and a corresponding decrease in static pressure can be caused. Once the pressure falls below the local saturated vapor pressure, cavitation nuclei existing in water begin to grow because their internal pressures become greater than the surface tension. When the flow pressure recovers, the growing nuclei become unstable and collapses. The resulting collapse results in creation of sonic waves which destroy solid matter and create internal heat in the medium.

In some embodiments, the groat-water mixture ratio (e.g., ratio of oat groat to water) is decreased (e.g., water is added to the groat-water mixture) prior to cavitation. In some embodiments, the groat-water mixture ratio (e.g., ratio of groats to water) during cavitation is about 1:1, about 1:1.6, about 1:2, about 1:3, about 1:3.2, about 1:4, about 1:4.8, about 1:5, about 1:6, about 1:6.4, about 1:7, or about 1:8. In some embodiments, the groat-water mixture (e.g., ratio of groats to water) during cavitation is about 1:2.

In some embodiments, the cavitation step is executed in a volume of at least 100 L, at least 150 L, at least 160 L, at least 165 L, at least 200 L, at least 250 L, at least 300 L, at least 400 L, or at least 500 L. In some embodiments, the cavitation step is executed in a volume of about 400 L. In some embodiments, the cavitation step is executed in a volume of about 500 L. In some embodiments, the cavitation step is executed in a volume of 400 L. In some embodiments, the cavitation step is executed in a volume of 500 L.

In some embodiments, the cavitation temperature at the start of the cavitation step is about 5° C., about 6° C., about 7° C., about 8° C., about 9° C., about 10° C., about 15° C., about 20° C., about 25° C., about 30° C., about 35° C., or about 45° C. In some embodiments, the cavitation temperature at the start of the cavitation step is about 5° C. In some embodiments the cavitation temperature at the start of the cavitation step is about 6.4° C. In some embodiments, the cavitation temperature at the start of the cavitation step is about 18.6° C. In some embodiments, the cavitation temperature at the start of the cavitation step is about 20° C. In some embodiments, the cavitation temperature at the start of the cavitation step is 20° C.

II. Examples

Example 1: Conventional Conditions/Results

FIG. 1 shows a chart indicating a relative activity % change of the enzyme BAN480L over temperature change. The enzyme used during the soaking step may have an activity rate that can change based on the soaking temperature. In FIG. 1, the relative activity % of BAN480L increases and peaks in between about 60° C. to about 80° C., more specifically in between about 65° C. to about 75° C., in between about 67° C. to about 83° C.

Example 2: Particle Size Distributions of Non-Optimized Test Runs

Fifteen different batches of the same mixture comprising oat groats as the pre-process concentrate, BAN480L amylase enzyme and water were prepared for a process in a container to produce oat-based milk. The mixing weight ratio of the oat groats to water for the soaking period was about 1:1.25. The mixture of oat groats and water was left for soaking for 50 mins before adding enzyme. The enzyme was added as 0.2% per kg of oat groats, i.e., per 55 kg of oat groats, 110 grams of enzyme was used. The total soaking time for each batch was 60 mins. The mixture of soaked oat groats, water and enzyme were dumped into cavitation vessel (after 60 mins of soaking) via feeding hopper, and then, the oat groats to water ratio before the cavitation step reduced to 1:2 by adding extra water to the pre-process concentrate.

For the respective batches, oat soaking times, hold durations, and hold temperatures were varied according to Table 1 below:

TABLE 1

| Test # | Test Description | Soaking Start Temper-ature, C. | Soaking End Temper-ature, C. | Ave. Soaking Temper-ature, C. | Soaking Duration, min | Actual Cav. Starting Temper-ature, C. | Expected Cav. Starting Temper-ature, C. | Liquefaction Hold Temper-ature, C. | Ave. Liquefaction Hold Temper-ature, C. | Liquefaction Duration, min | Inaction time at 95 C., min |
|---|---|---|---|---|---|---|---|---|---|---|---|
| 1 | Cavitation & liquefaction | 6 | 8 | 7 | 60 | 7.3 | 5 | 69-71 (70) | 70 | 15 | 0 |
| 2 | Cavitation & liquefaction | 21 | 18 | 19.5 | 60 | 17.4 | 20 | 69-71 (70) | 70 | 15 | 0 |
| 3 | Cavitation & liquefaction | 43 | 35 | 39 | 60 | 32.4 | 45 | 69-71 (70) | 70 | 15 | 0 |
| 4 | Cavitation & liquefaction | 4.4 | 5 | 4.7 | 60 | 5.5 | 5 | 69-71 (70) | 70 | 30 | 0 |
| 5 | Cavitation & liquefaction | 20 | 19 | 19.5 | 60 | 18.6 | 20 | 69-71 (70) | 70 | 30 | 0 |
| 6 | Cavitation & liquefaction | 40 | 31 | 35.5 | 60 | 33.4 | 45 | 69-71 (70) | 70 | 30 | 0 |
| 7 | Cavitation & liquefaction | 5 | 5.5 | 5.25 | 60 | 6.4 | 5 | 69-71 (70) | 70 | 90 | 0 |
| 8 | Cavitation & liquefaction | 22 | 18 | 20 | 60 | 24.6 | 20 | 69-71 (70) | 70 | 90 | 0 |
| 9 | Cavitation & liquefaction | 43 | 32 | 37.5 | 60 | 34.5 | 45 | 69-71 (70) | 70 | 90 | 0 |
| 10 | Cavitation & liquefaction | 8 | 9 | 8.5 | 60 | 10.9 | 5 | 84-86 (85) | 85 | 15 | 0 |
| 11 | Cavitation & liquefaction | 25 | 22 | 23.5 | 60 | 24.2 | 20 | 84-86 (85) | 85 | 15 | 0 |
| 12 | Cavitation & liquefaction | 46 | 35 | 40.5 | 60 | 30.8 | 45 | 84-86 (85) | 85 | 15 | 0 |
| 13 | Cavitation & liquefaction | 6 | 9 | 7.5 | 60 | 5.9 | 5 | 84-86 (85) | 85 | 90 | 0 |
| 14 | Cavitation & liquefaction | 41 | 37 | 39 | 60 | 32.5 | 20 | 84-86 (85) | 85 | 90 | 0 |
| 15 | Cavitation & liquefaction | 23 | 22 | 22.5 | 60 | 20.7 | 45 | 84-86 (85) | 85 | 90 | 0 |

The product samples from the test batches as the post-process concentrates after the completion of the cavitation step and liquefaction step were analyzed for particle size distributions (PSD).

Table 2 shows the result of D90 values of the test batches as the post-process concentrates (e.g., non-decanted concentrate post cavitation and pre-decanter step) based on the particle size distributions. D90 is a particle diameter size which 90% of particles have smaller diameter than that particle. The test batch parameters (Table 1) and resulting D90 values (Table 2) were also plotted on FIG. 2.

TABLE 2

| Test # | Test Description (steps) | D90 (microns) |
|---|---|---|
| 1 | Cavitation & liquefaction | 707 |
| 2 | Cavitation & liquefaction | 391 |
| 3 | Cavitation & liquefaction | 483 |
| 4 | Cavitation & liquefaction | 525 |
| 5 | Cavitation & liquefaction | 385 |
| 6 | Cavitation & liquefaction | 432 |
| 7 | Cavitation & liquefaction | 336 |
| 8 | Cavitation & liquefaction | 441 |
| 9 | Cavitation & liquefaction | 468 |
| 10 | Cavitation & liquefaction | 409 |
| 11 | Cavitation & liquefaction | 634 |
| 12 | Cavitation & liquefaction | 823 |
| 13 | Cavitation & liquefaction | 598 |
| 14 | Cavitation & liquefaction | 403 |
| 15 | Cavitation & liquefaction | 622 |

In the case of the oat-based beverage, finer particles in the post-process concentrates can provide in turn a better-quality product, as finer particle may provide a better taste, better coloration, longer suspension of particles, etc. In the case of D90 sizes of that are less than about 450 microns, the particles were fine enough to not require an additional process to further reduce the particle sizes, such as less post treatments including shorter shear mixing. In addition, in the case of D90 sizes that are less than about 450 microns, the particles were fine enough such that it would reduce the percentage of product which was wasted after centrifuge (decanter).

Following the deactivation of the enzymes from the cavitation step and liquefaction step, the post treatment steps which may include dilution, sheer mixing and sieving of the product before packaging etc.

Figure 2:
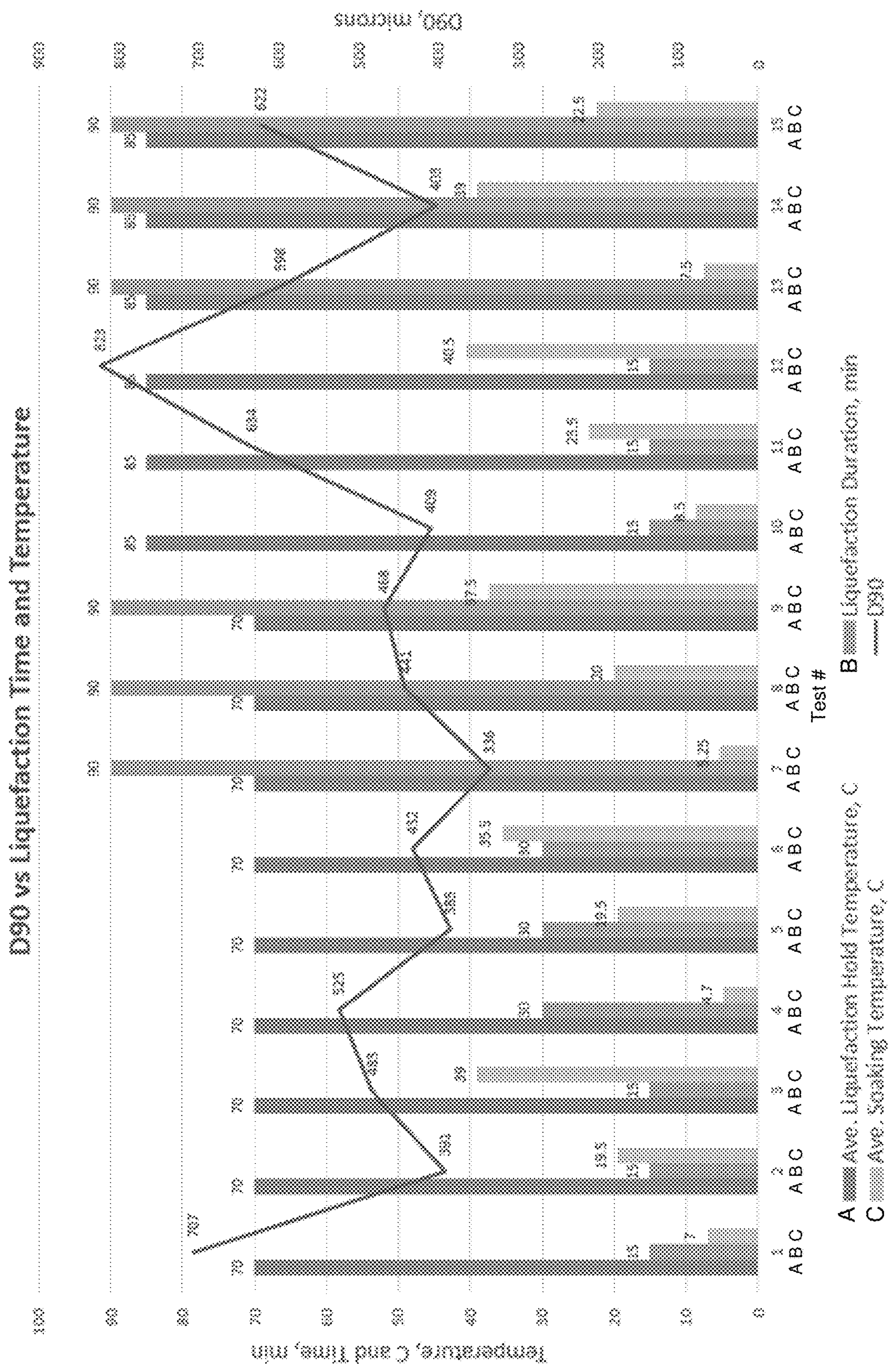
FIG. 2 shows a chart indicating D90 particle sizes of test batches based on different cavitation and liquefaction parameters according to certain embodiments.

FIG. 2 illustrates a chart indicating particle diameter sizes which 90% of particles have smaller diameters than the particle (D90) of test batches based on different cavitation and liquefaction parameters in certain embodiments.

Figure 3A:
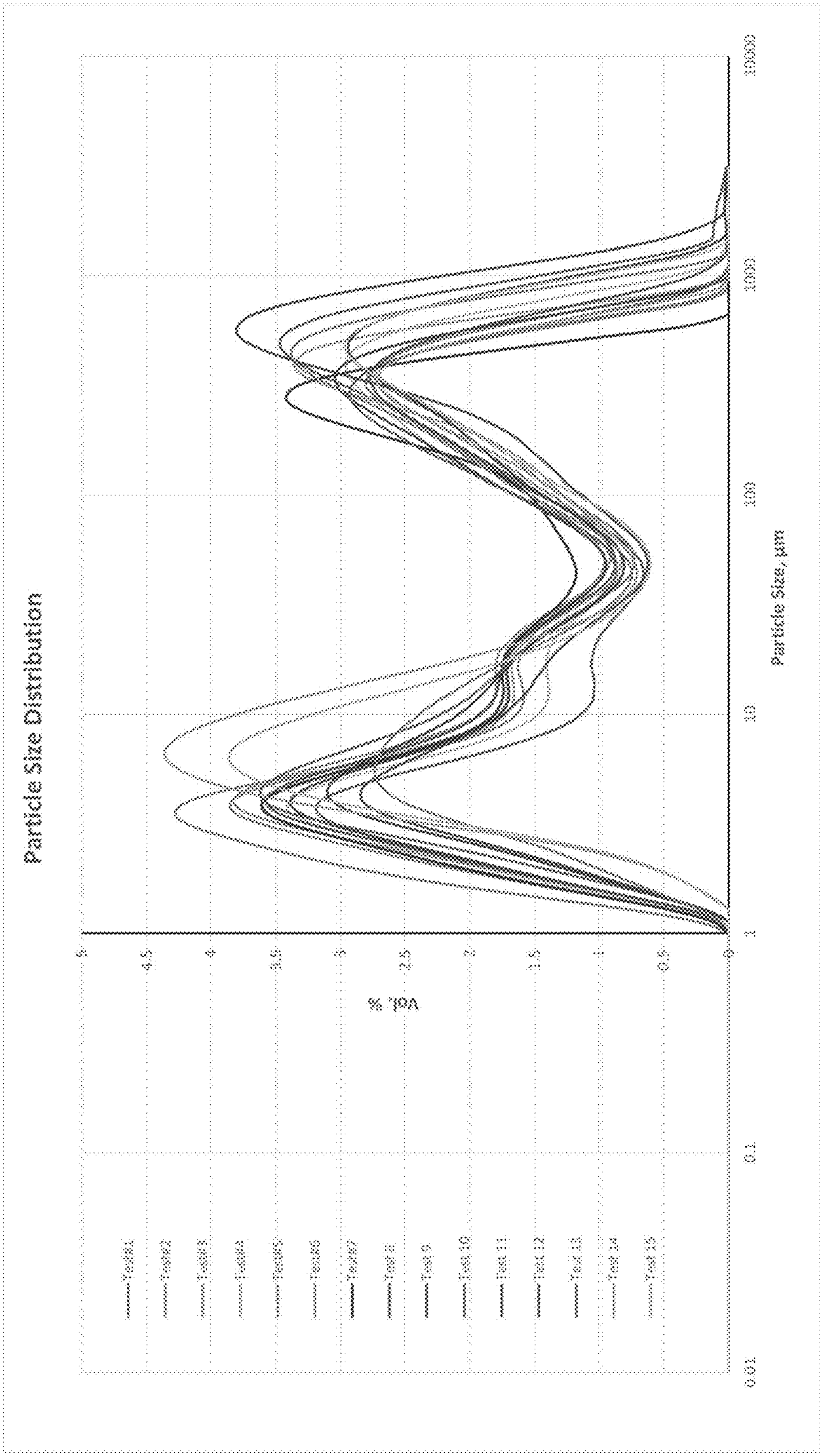
FIG. 3A shows a chart indicating particle size distributions of test runs, prior to decantation, according to certain embodiments.
Figure 3B:
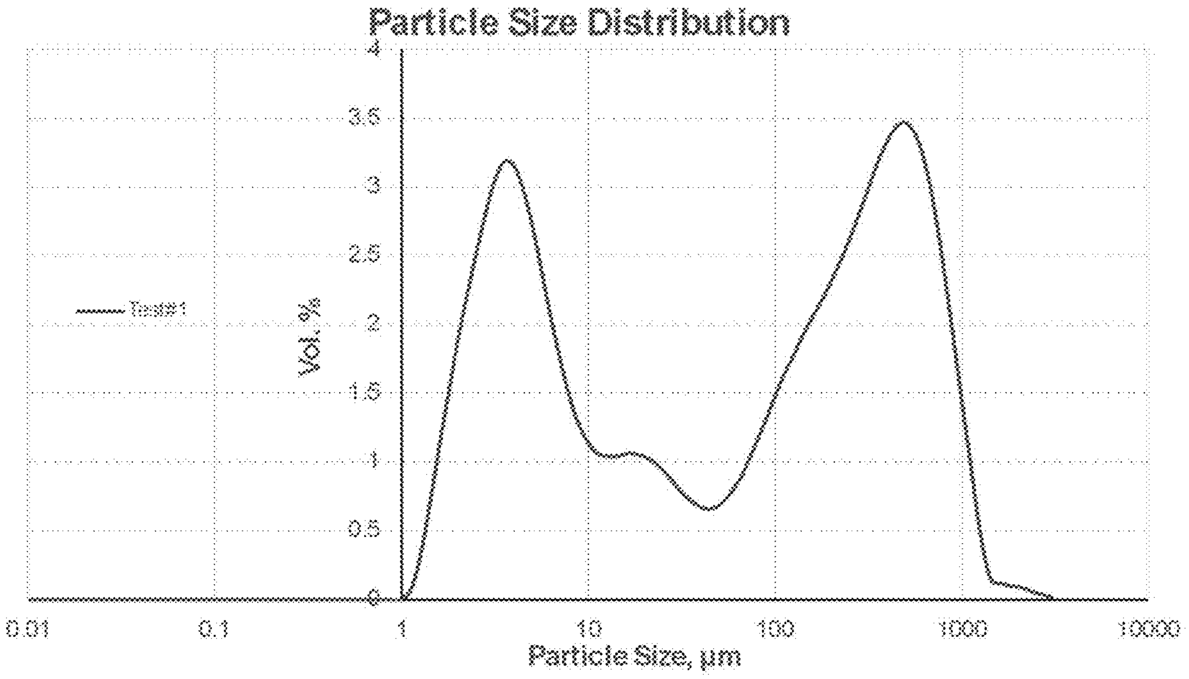
FIGS. 3B-3P shows individually plotted curves from each of the test runs shown in FIG. 3A.
Figure 3C:
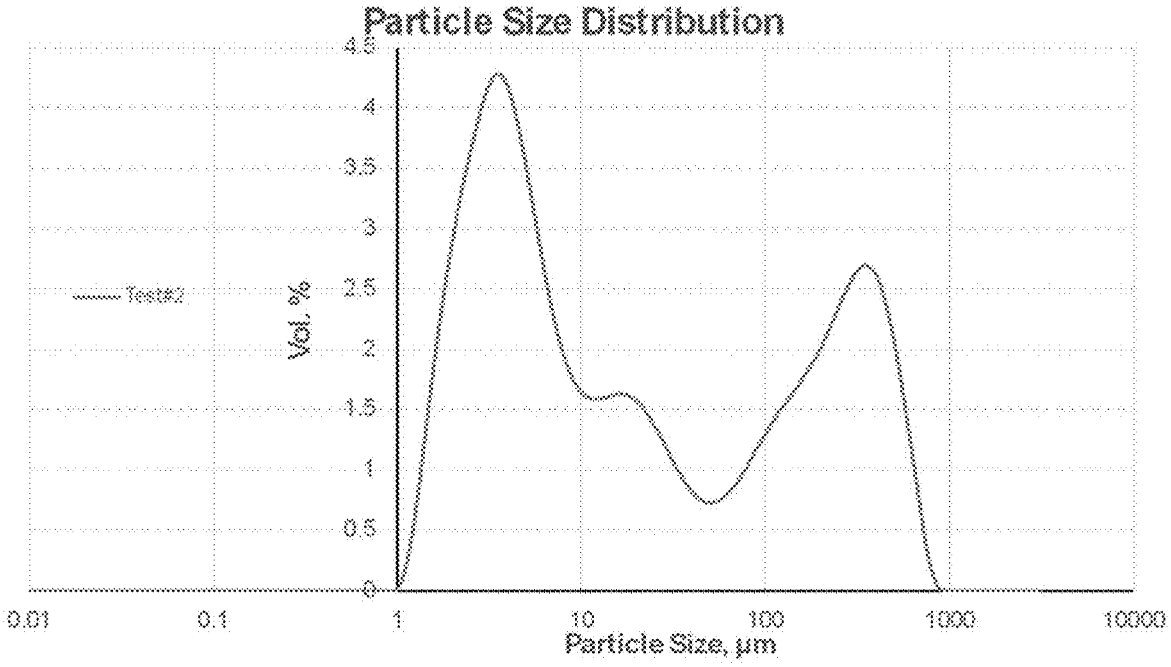
Figure 3D:
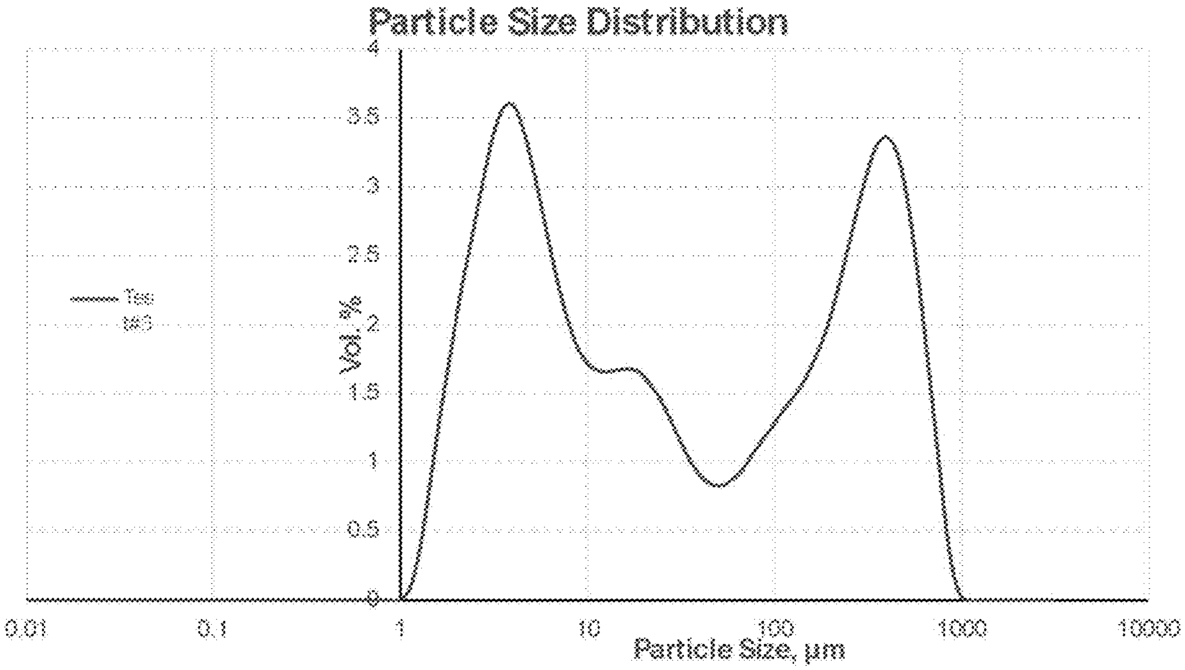
Figure 3E:
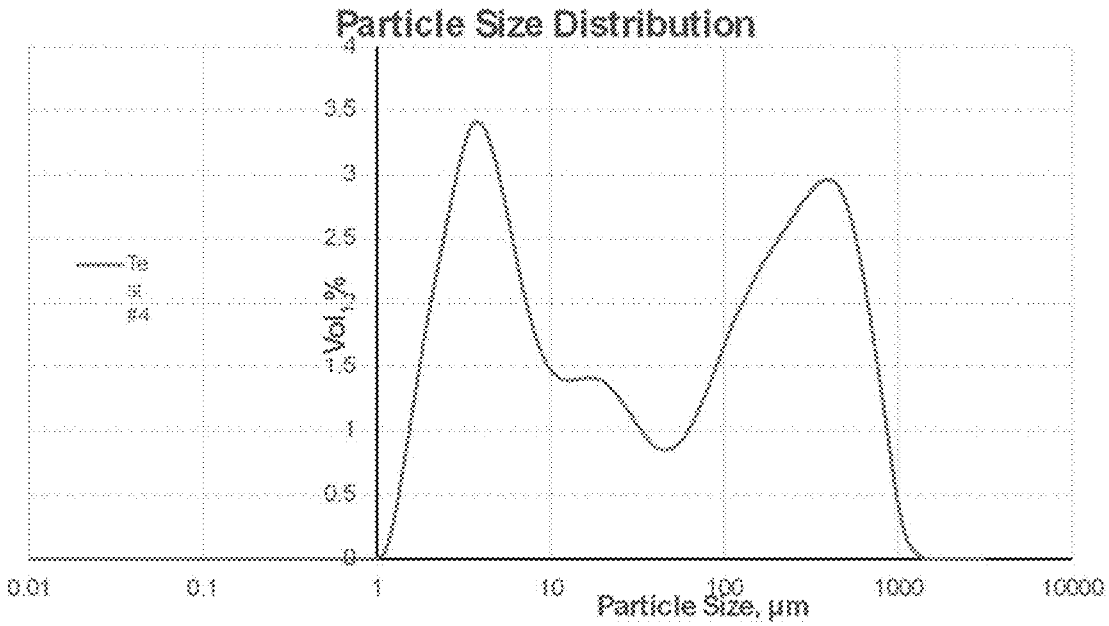
Figure 3F:
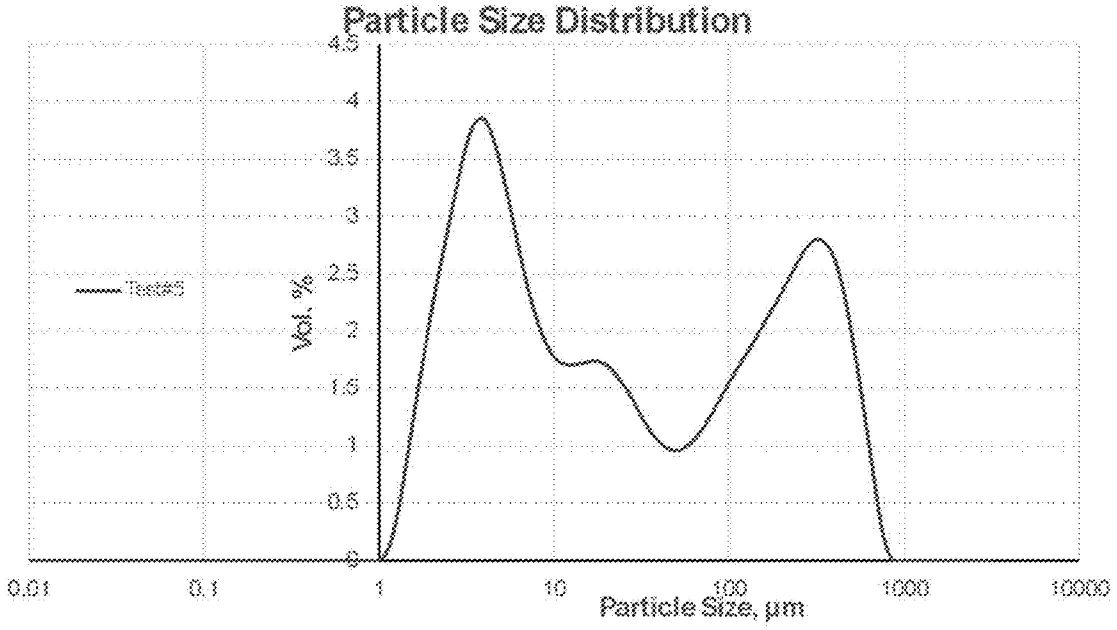
Figure 3G:
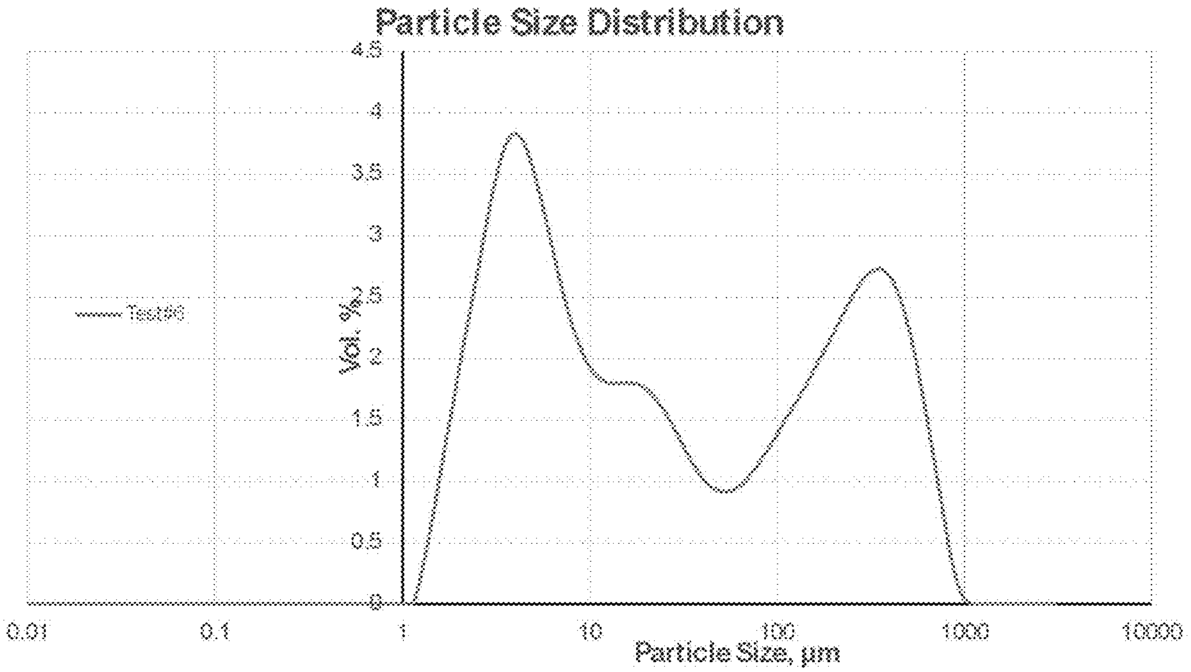
Figure 3H:
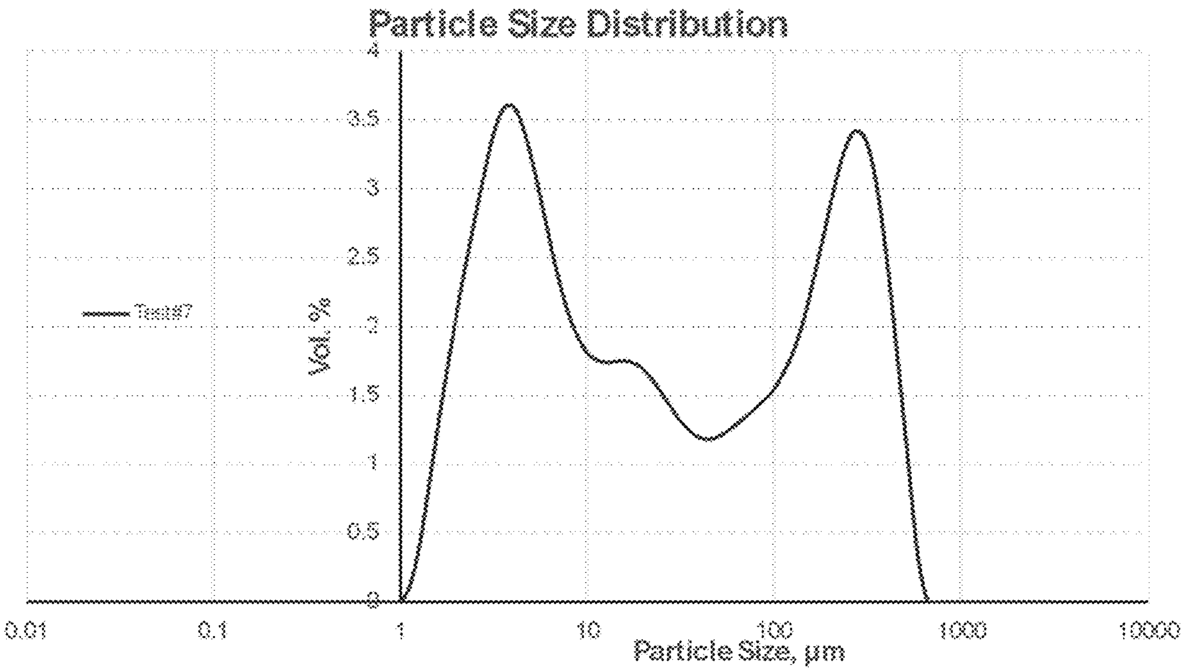
Figure 3I:
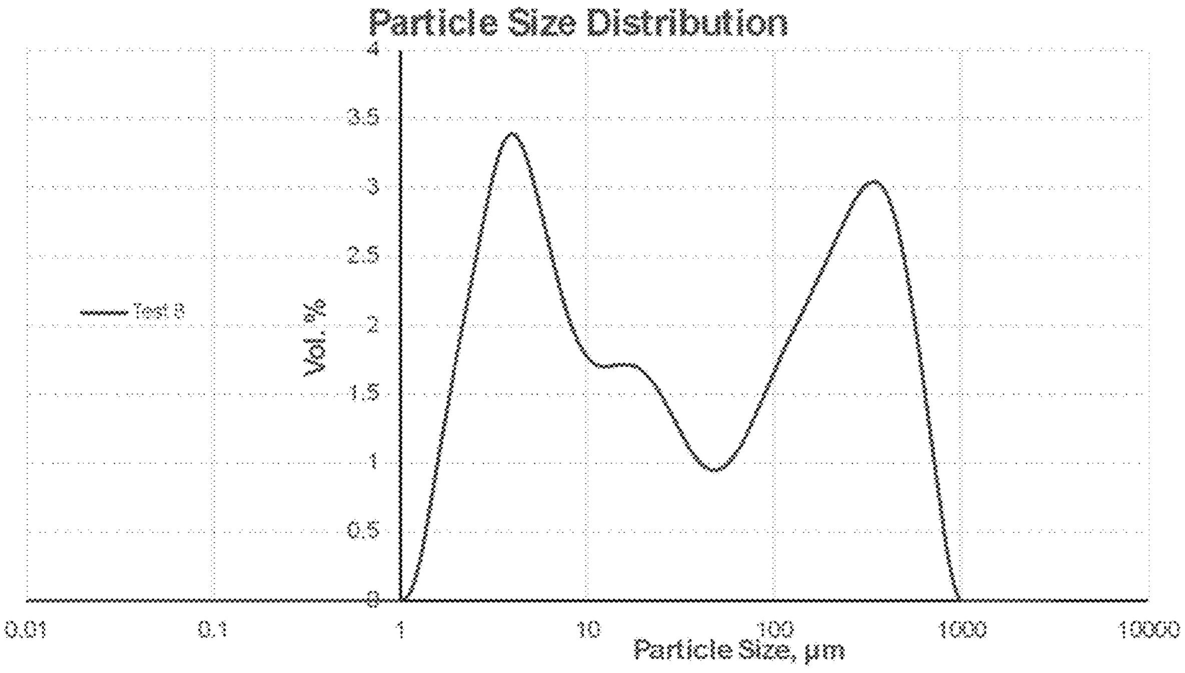
Figure 3J:
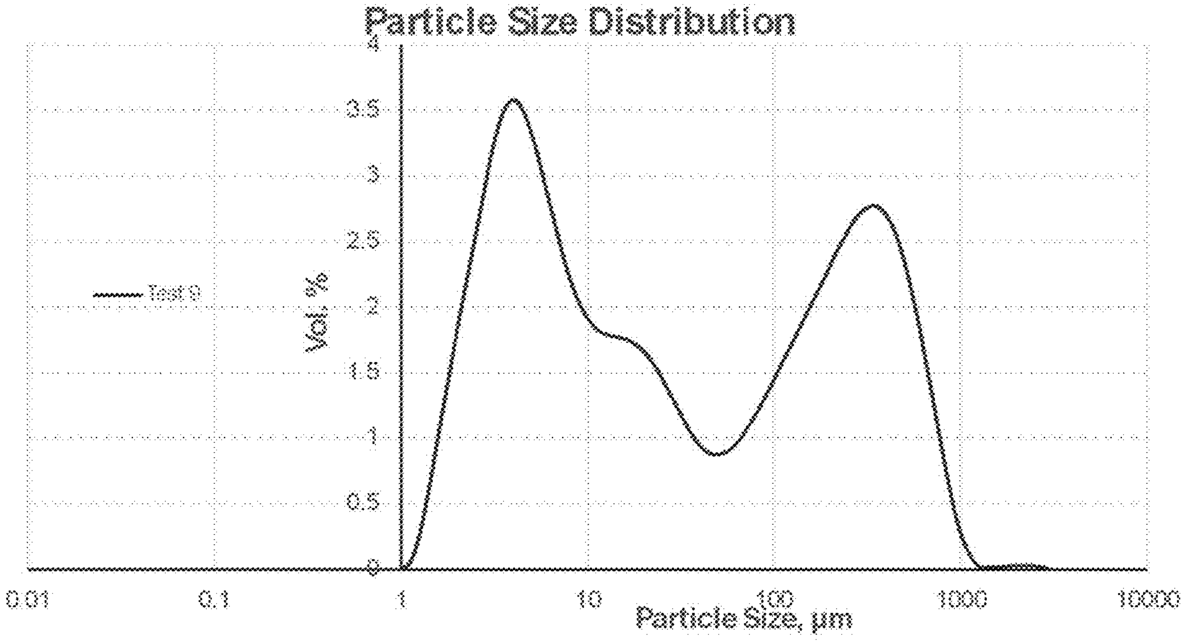
Figure 3K:
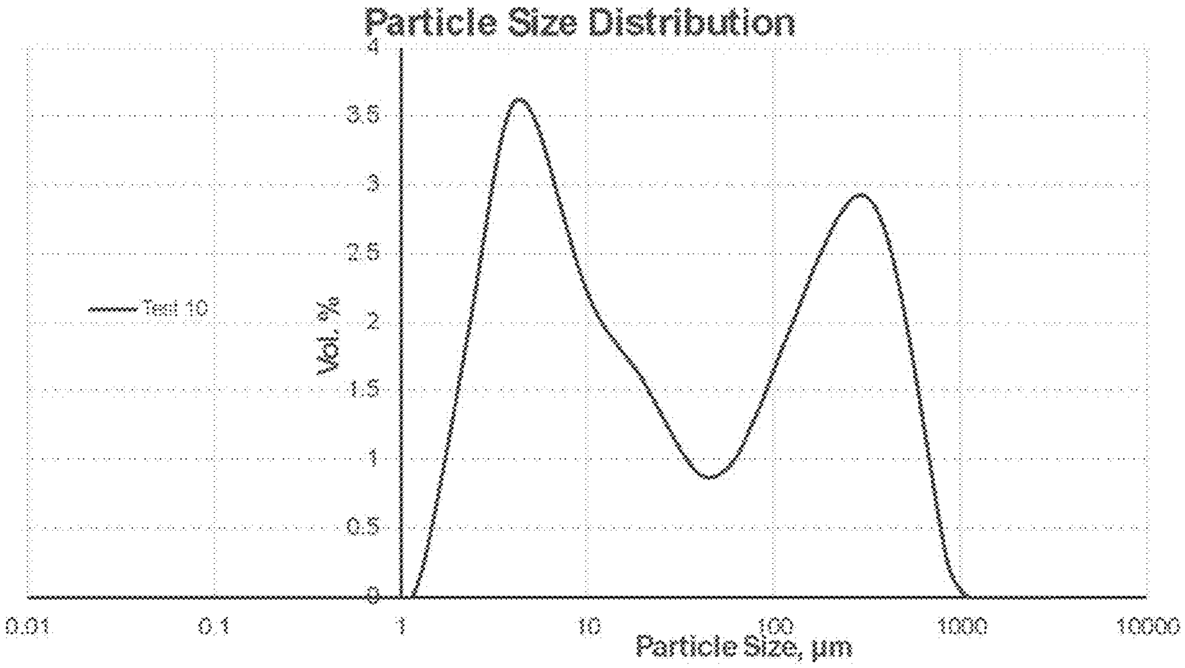
Figure 3L:
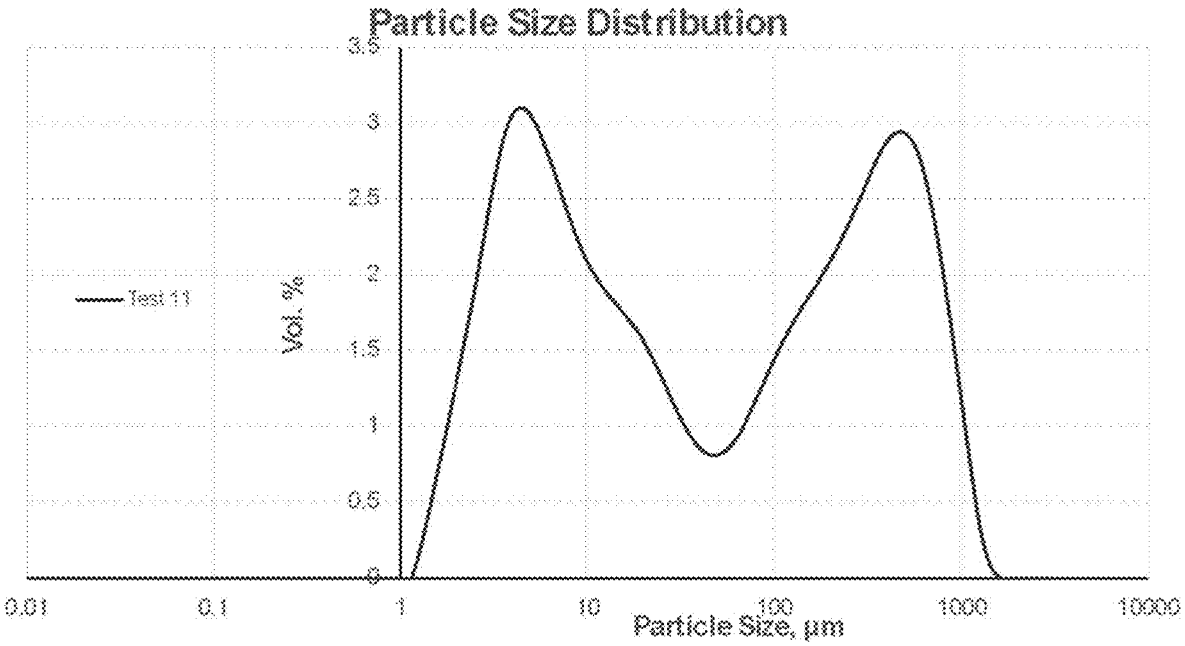
Figure 3M:
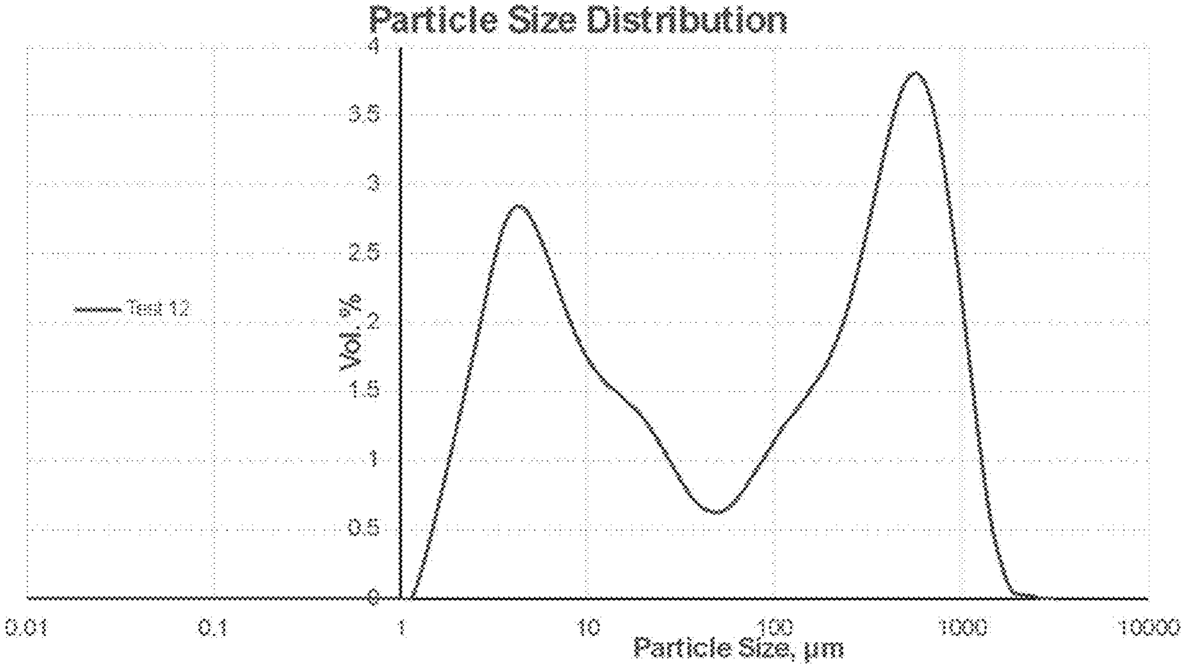
Figure 3N:
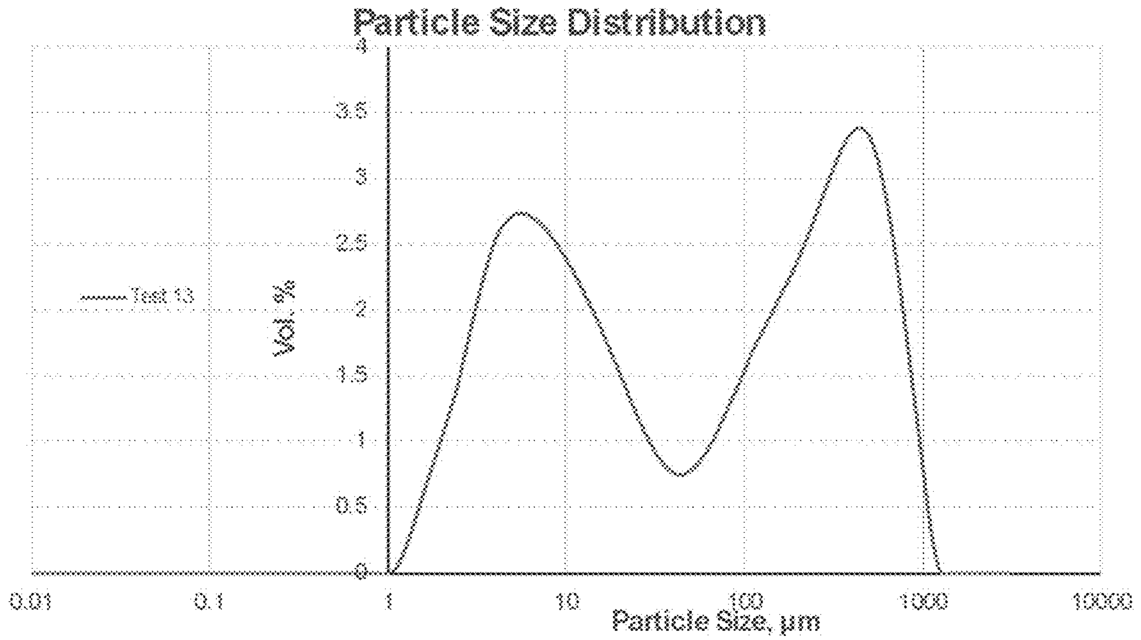
Figure 3O:
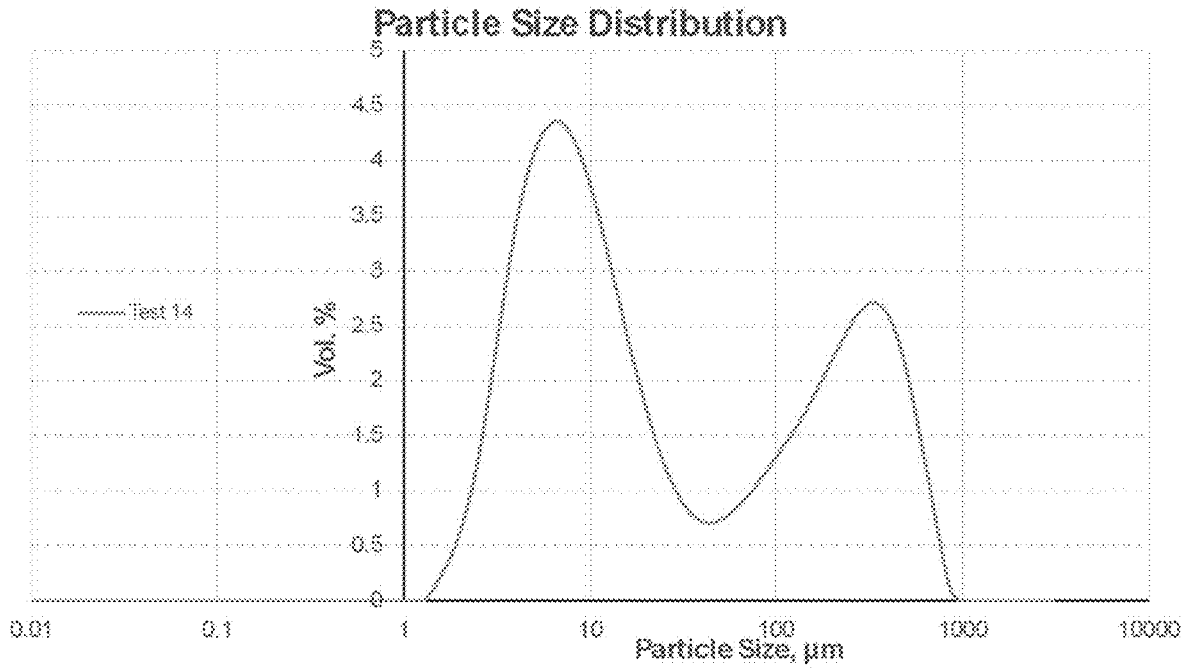
Figure 3P:
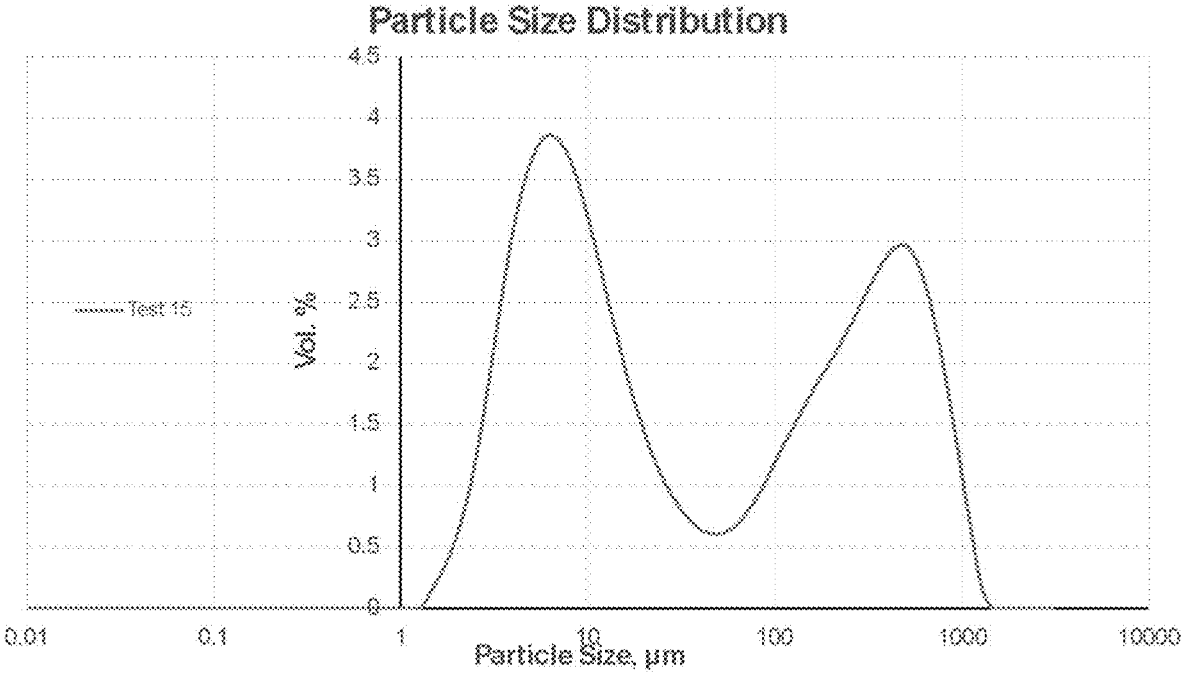

FIGS. 3A-3P illustrates charts indicating particle size distributions for resulting from the test runs conducted in Table 1. The data as shown in FIGS. 3A-3P is from samples collected from each test run prior to the decantation process, such that larger bran particles are still present, as seen in the second peak observed in each of the test runs around the 500-1000 D90 micron size.

Referring to Tables 1-2 and FIGS. 2-3, a representative example is the D90 related to test #2, which resulted at the lowest temperature (70° C.) and the duration (15 mins). In addition, the soaking temperature is the room temperature where the test start batch did not require cooling or heating the soaking water. This eliminates the need for a cooler or a heater hence less energy consumption. Temperature and time are both factors affecting the cost, efficiency, and sustainability. Importantly, after a cavitation not involving the parameters disclosed in the present disclosure, the samples were generally left with bran particles of substantial sizes that will affect the quality of the product in terms of, for example, coloration, taste, and particle suspension duration in the product. The need for shear mixing by a shear mixer after the cavitation and liquefaction/saccharification, was substantially reduced or practically eliminable. Removing those larger particles need to go through a shearing process to cut them into small pieces and leave them in the product—without the shearing process to cut the bran particle, the particles including larger bran particles make into the final product lead to a bitter taste and unpleasant color (with brown bran cuts). With the conventional product, the decanting process (e.g., the decanter step) was required to reduce the bran particles, and, even when the decanting process was conducted after shear mixer and even after decanting, bran particles were still left in the product.

With the unexpectedly discovered effect of particle size reduction by optimizing conditions according to the present disclosure as represented by, for example, Test #s 2, 3, 4, 5, 6, were substantial enough to bring the decanter further upstream of the process in a way that right after saccharification the product with bran was flowed directly to decanter bypassing the shear mixer. Based on analysis of the tests, it was determined that there were almost no bran particles left in the product. In addition, since the process had been optimized as above, D90 after decanter was in an acceptable range where the need to do a shear mixing after decanting was practically avoided. Removing the shear mixer from the process line leads to a significant save in the cost, consumed energy, and the time of process.

Example 3: Particle Size Distributions of Optimized Test Runs

In order to further optimize the operating parameters of the process, a set of experiments was conducted. The experiments were conducted using a cavitation vessel with the volume of approximately 400 L.

200 liters of water was transferred to soaking hopper at different temperatures. After recording the actual initial temperature of water, 145 kg of oat groats were dumped on top of the water. Once agitation began, 290 grams (2 g/kg of oats) of enzyme (BAN480 L) was added to the soaking hopper. The entire soaking time with agitation was set to an hour. The temperature of the slurry was recorded again right before starting the cavitation step. The average of two recorded temperatures was used as the soaking temperature.

Once the content of soaking hopper was transferred to the cavitation vessel, water was injected to reach a total volume of around 400 liters. Then, the cavitation step was initiated with a pump speed of 60 Hz. Once the temperature reached the desired value (liquefaction temperature) as per experiment design, the pump was stopped, and the product was held in the vessel by maintaining the temperature for the period liquefaction time. When the liquefaction time was over, the product was sent over to the buffer tank and decanting (separation of bran) started immediately. Samples were collected at the outlet of decanter, labeled and passed to the lab for analysis.

Table 3 shows factors and respective ranges used in optimizing the process.

TABLE 3

| Factor | Name | Units | Type | Minimum | Maximum | Coded Low | Coded High | Mean |
|---|---|---|---|---|---|---|---|---|
| A | Soaking Temperature | C. | Numeric | 10.00 | 30.00 | −1 ↔ 10.00 | +1 ↔ 30.00 | 20.00 |
| B | Liquefaction Temperature | C. | Numeric | 55.00 | 85.00 | −1 ↔ 55.00 | +1 ↔ 85.00 | 70.00 |
| C | Liquefaction Time | min | Numeric | 5.00 | 85.00 | −1 ↔ 5.00 | +1 ↔ 85.00 | 45.00 |

The viscosity for select samples before and after a decanter step was analyzed with a Brookfield viscometer. For a select number of samples over a period of 25 minutes at three RPM settings (10, 20, and 50), with the sample maintained at 20° C. The results are shown in Tables 3A-3D. Spindle 1 was used for the analysis except for 308585 #1R where spindle 2 was used since the motor % exceeded the limit for spindle 1 due to higher viscosity.

TABLE 3A

Viscosity analysis of 207045#6 and 207045#6 - Decanter

| | | 207045#6 | | 207045#6 - Decanter | |
|---|---|---|---|---|---|
| RPM | Time | Viscosity (cP) | Motor % | Viscosity (cP) | Motor % |
| 10 | 0 | 2820 | 70.5 | 2276 | 56.2 |
| | 5 | 2588 | 64.5 | 1764 | 44.0 |
| | 10 | 2460 | 61.4 | 1560 | 39.0 |
| | 15 | 2380 | 59.5 | 1448 | 36.2 |
| | 20 | 2320 | 58.2 | 1380 | 34.3 |
| | 25 | 2280 | 57.0 | 1320 | 33.0 |
| 20 | 0 | 1374 | 68.5 | 840 | 42.0 |
| | 5 | 1344 | 67.2 | 796 | 39.8 |
| | 10 | 1316 | 65.8 | 770 | 38.5 |
| | 15 | 1294 | 64.4 | 752 | 37.5 |
| | 20 | 1268 | 63.5 | 732 | 36.6 |
| | 25 | 1254 | 62.6 | 712 | 35.7 |
| 50 | 0 | 738 | 92.1 | 484 | 60.2 |
| | 5 | 721 | 90.0 | 422 | 52.7 |
| | 10 | 706 | 88.1 | 404 | 50.3 |
| | 15 | 690 | 86.3 | 391 | 48.8 |
| | 20 | 683 | 85.5 | 381 | 47.7 |
| | 25 | 676 | 84.5 | 372 | 46.6 |

TABLE 3B

Viscosity analysis of 105585#1 and 105585#1 - Decanter

| | | 105585#1 | | 105585#1 - Decanter | |
|---|---|---|---|---|---|
| RPM | Time | Viscosity (cP) | Motor % | Viscosity (cP) | Motor % |
| 10 | 0 | 1400 | 34.9 | 972 | 23.9 |
| | 5 | 1248 | 31.2 | 792 | 19.8 |
| | 10 | 1208 | 30.2 | 700 | 17.5 |
| | 15 | 1172 | 29.3 | 640 | 16.0 |

TABLE 3B-continued

Viscosity analysis of 105585#1 and 105585#1 - Decanter

| | | 105585#1 | | 105585#1 - Decanter | |
|---|---|---|---|---|---|
| RPM | Time | Viscosity (cP) | Motor % | Viscosity (cP) | Motor % |
| | 20 | 1148 | 28.7 | 604 | 15.1 |
| | 25 | 1128 | 28.2 | 564 | 14.2 |
| 20 | 0 | 848 | 42.1 | 428 | 21.3 |
| | 5 | 796 | 39.8 | 404 | 20.2 |
| | 10 | 766 | 38.3 | 374 | 18.7 |
| | 15 | 750 | 37.4 | 348 | 17.3 |
| | 20 | 732 | 36.6 | 322 | 16.1 |
| | 25 | 716 | 35.8 | 300 | 15.1 |
| 50 | 0 | 537 | 66.3 | 248 | 31.1 |
| | 5 | 494 | 61.7 | 220 | 27.7 |
| | 10 | 474 | 59.2 | 208 | 25.9 |
| | 15 | 462 | 56.0 | 201 | 25.0 |
| | 20 | 448 | 55.9 | 191 | 24.0 |
| | 25 | 438 | 54.8 | 188 | 23.5 |

TABLE 3C

Viscosity analysis of 205545#1R and 205545#1R - Decanter

| | | 205545#1R | | 205545#1R - Decanter | |
|---|---|---|---|---|---|
| RPM | Time | Viscosity (cP) | Motor % | Viscosity (cP) | Motor % |
| 10 | 0 | 1044 | 26.1 | 1020 | 25.4 |
| | 5 | 976 | 24.2 | 928 | 23.2 |
| | 10 | 916 | 22.9 | 820 | 20.5 |
| | 15 | 880 | 21.8 | 776 | 19.4 |
| | 20 | 836 | 21.0 | 740 | 18.5 |
| | 25 | 804 | 20.2 | 716 | 17.8 |
| 20 | 0 | 624 | 31.1 | 448 | 22.2 |
| | 5 | 592 | 29.6 | 412 | 20.6 |
| | 10 | 574 | 28.7 | 404 | 20.1 |
| | 15 | 560 | 28.1 | 384 | 19.2 |
| | 20 | 548 | 27.3 | 368 | 18.4 |
| | 25 | 536 | 26.8 | 358 | 17.9 |
| 50 | 0 | 413 | 51.6 | 237 | 30.6 |
| | 5 | 386 | 48.2 | 242 | 30.2 |
| | 10 | 374 | 46.7 | 235 | 29.4 |
| | 15 | 369 | 46.1 | 230 | 28.8 |

TABLE 3C-continued

Viscosity analysis of 205545#1R and 205545#1R - Decanter

| | | 205545#1R | | 205545#1R - Decanter | |
|---|---|---|---|---|---|
| RPM | Time | Viscosity (cP) | Motor % | Viscosity (cP) | Motor % |
| | 20 | 362 | 45.2 | 229 | 28.6 |
| | 25 | 356 | 44.5 | 225 | 28.1 |

TABLE 3D

Viscosity analysis of 308585#1R and 308585#1R - Decanter

| | | 308585#1R* | | 308585#1R - Decanter | |
|---|---|---|---|---|---|
| RPM | Time | Viscosity (cP) | Motor % | Viscosity (cP) | Motor % |
| 10 | 0 | 972 | 23.8 | 1780 | 44.1 |
| | 5 | 916 | 22.8 | 1564 | 39.1 |
| | 10 | 908 | 22.6 | 1496 | 37.4 |
| | 15 | 904 | 22.5 | 1464 | 36.5 |
| | 20 | 900 | 20.4 | 1440 | 36.1 |
| | 25 | 900 | 20.4 | 1428 | 35.6 |
| 20 | 0 | 558 | 27.9 | 942 | 46.7 |
| | 5 | 548 | 27.4 | 902 | 45.1 |
| | 10 | 542 | 27.1 | 878 | 43.9 |
| | 15 | 542 | 27.1 | 860 | 43.0 |
| | 20 | 540 | 27 | 850 | 42.6 |
| | 25 | 540 | 27 | 840 | 42 |
| 50 | 0 | 320 | 39.8 | 551 | 68.4 |
| | 5 | 301 | 37.6 | 493 | 61.5 |
| | 10 | 294 | 36.8 | 481 | 60.2 |
| | 15 | 294 | 36.7 | 476 | 59.5 |
| | 20 | 290 | 36.3 | 471 | 58.8 |
| | 25 | 288 | 36.0 | 467 | 58.3 |

*Spindle 2 was used for 308585#1R since the motor % exceeded the limit for spindle 1 whereas 308585#1R - Decanter was analyzed with spindle 1.

Table 4 shows selected oat concentrate process variables and runs, as well as the resulting responses in terms of D90 values, solid content percentages, and viscosity. D90 results shown in Table 4 were for the concentrate product which was decanted. The values shown on the last column of table 4 are the selected values at time of 25 mins and speed of 50 rpm, at T=20° C.

TABLE 4

| Run | Factor 1 A: Soaking Temp C. | Factor 1 A: Soaking Temp C. | Factor 2 B: Liquefaction Temperature C. | Factor 3 C: Liquefaction Time min | Response 1 D90 µm | Response 2 Solid Content % | Response 3 Viscosity (50 rpm, 25 min, T = 20° C.) cP |
|---|---|---|---|---|---|---|---|
| 1 | 20 | 18.55 | 55 | 45 | 61.2 | 19.63 | 225 |
| 2 | 30 | 25.15 | 85 | 85 | 23.4 | 28.27 | 467 |
| 3 | 30 | 27.5 | 55 | 85 | 15.3 | 22.5 | — |
| 4 | 10 | 14.45 | 55 | 5 | 29.1 | 20.15 | 289 |
| 5 | 20 | 18.85 | 70 | 5 | 52.7 | 25 | 206 |
| 6 | 20 | 16.15 | 70 | 45 | 31.5 | 25.26 | — |
| 7 | 30 | 27.7 | 70 | 45 | 64.1 | 28.44 | 205 |
| 8 | 10 | 14.25 | 85 | 85 | 30.3 | 27.06 | 208 |
| 9 | 10 | 15.9 | 85 | 5 | 116 | 25.92 | 244 |
| 10 | 20 | 19.05 | 85 | 45 | 36.5 | 25.2 | 291 |
| 11 | 20 | 19 | 70 | 45 | 51.2 | 26.97 | 199 |
| 12 | 30 | 27.5 | 85 | 5 | 43.5 | 26.63 | 195.2 |
| 13 | 20 | 18.5 | 70 | 45 | 37.1 | 26.12 | 197.3 |
| 14 | 10 | 11.9 | 70 | 45 | 29.5 | 25.3 | 162 |
| 15 | 20 | 19.75 | 70 | 45 | 51.7 | 28.06 | 281 |
| 16 | 20 | 18.1 | 70 | 45 | 23.1 | 28.85 | 192 |
| 17 | 30 | 26.75 | 55 | 5 | 12.8 | 14.08 | 272 |
| 18 | 20 | 18.75 | 70 | 85 | 29.6 | 24.97 | 152 |
| 19 | 10 | 10.95 | 55 | 85 | 19.2 | 22.04 | 188 |
| 20 | 20 | 18.55 | 70 | 45 | 12.7 | 24.52 | 372 |

Figure 4A:
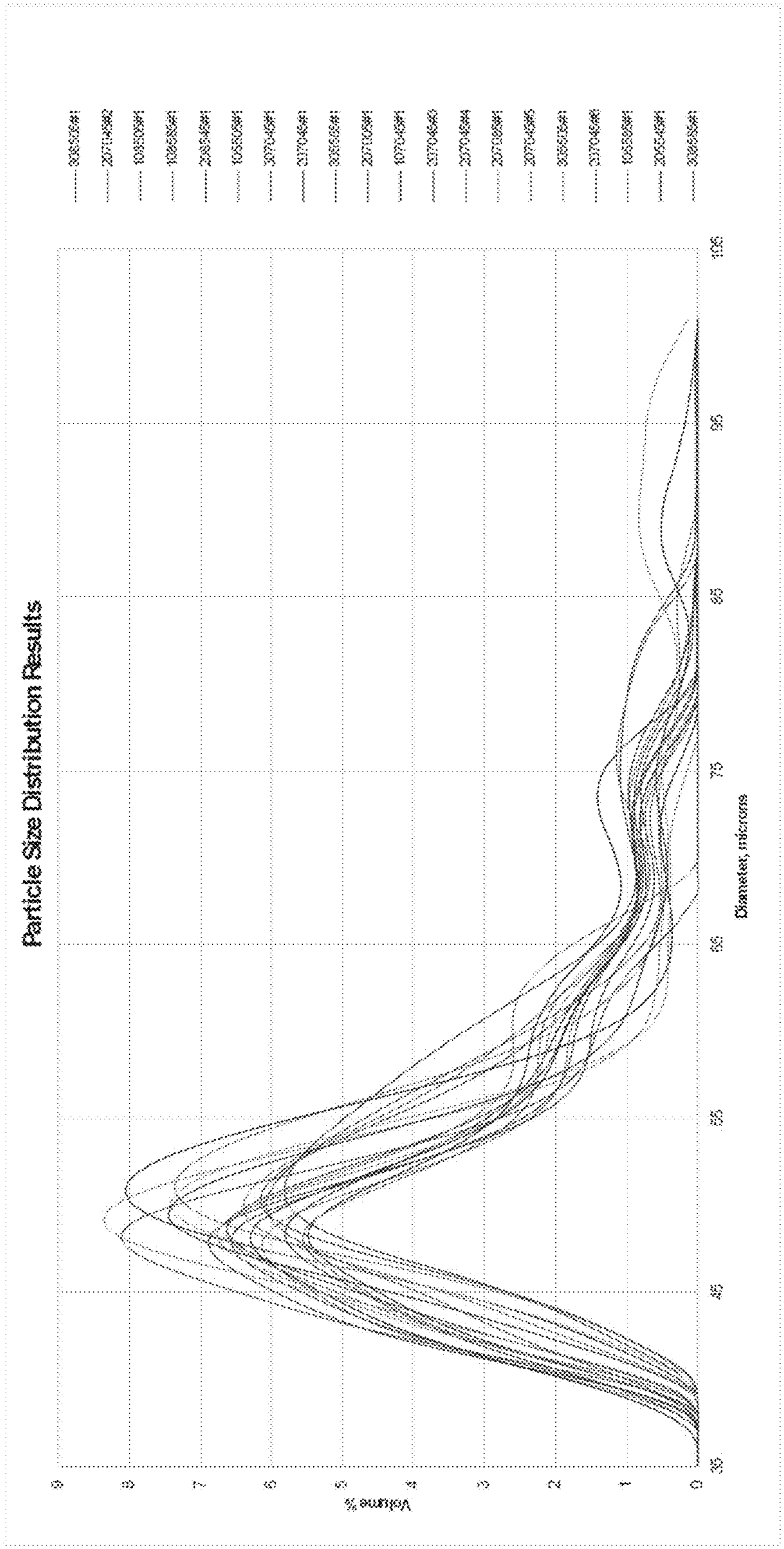
FIG. 4A shows a chart indicating particle size distribution results of optimization experimentation, after decantation, according to certain embodiments.
Figure 4B:
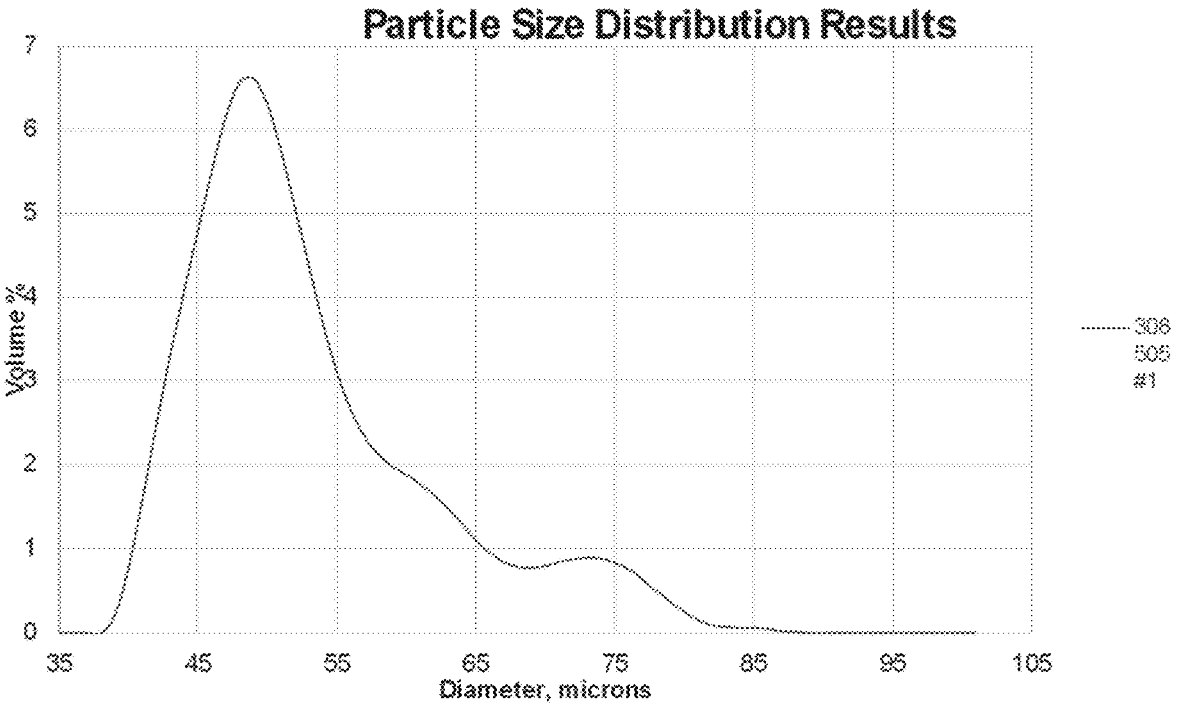
FIGS. 4B-4U shows individually plotted curves from each of the test runs shown in FIG. 4A.
Figure 4C:
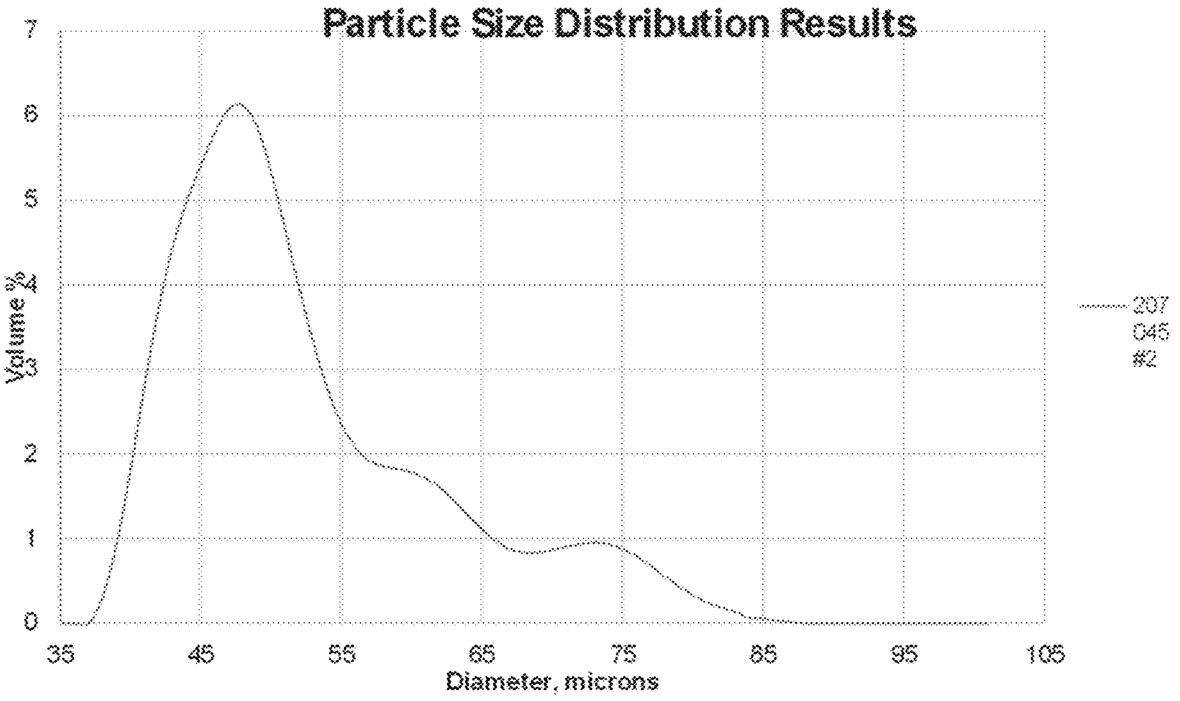
Figure 4D:
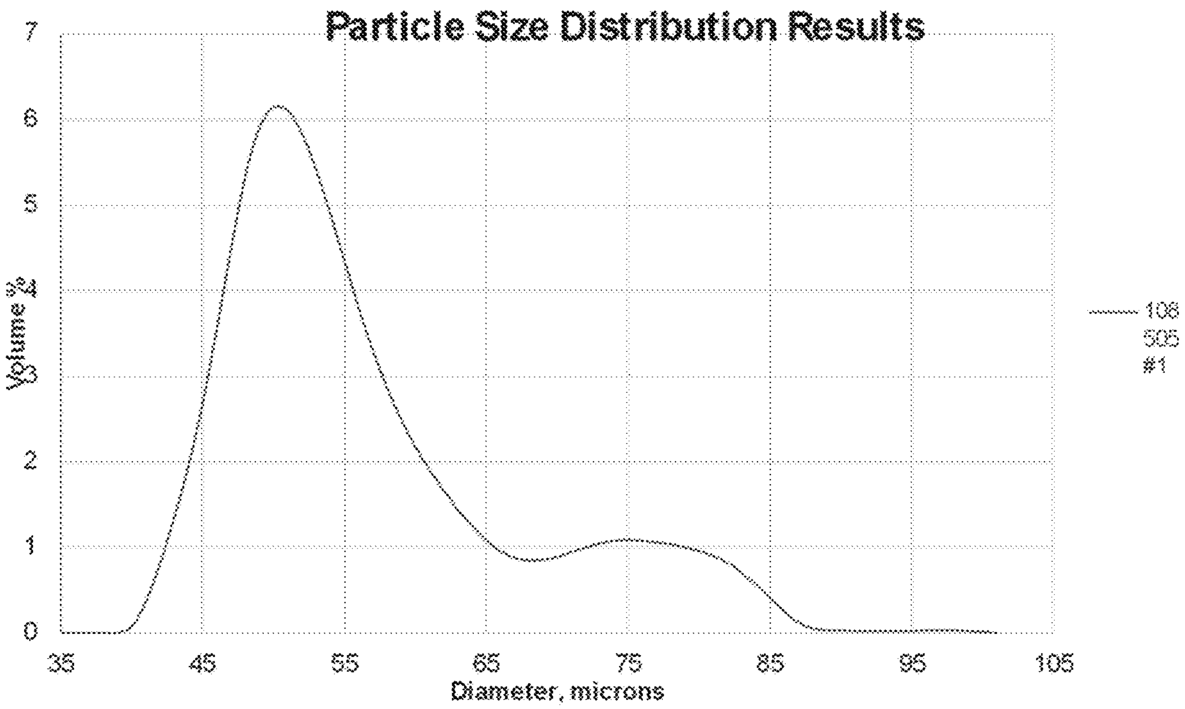
Figure 4E:
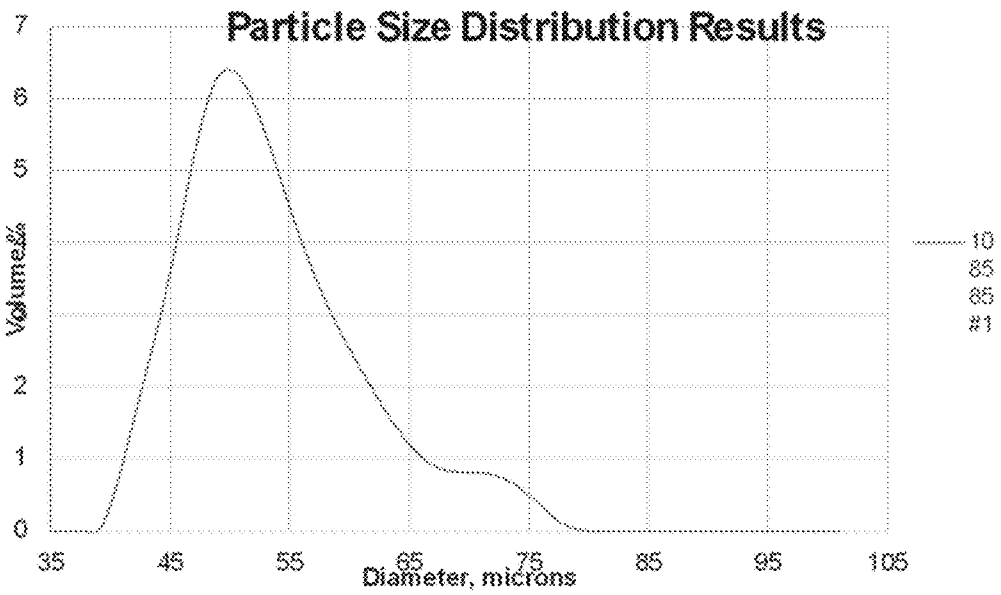
Figure 4F:
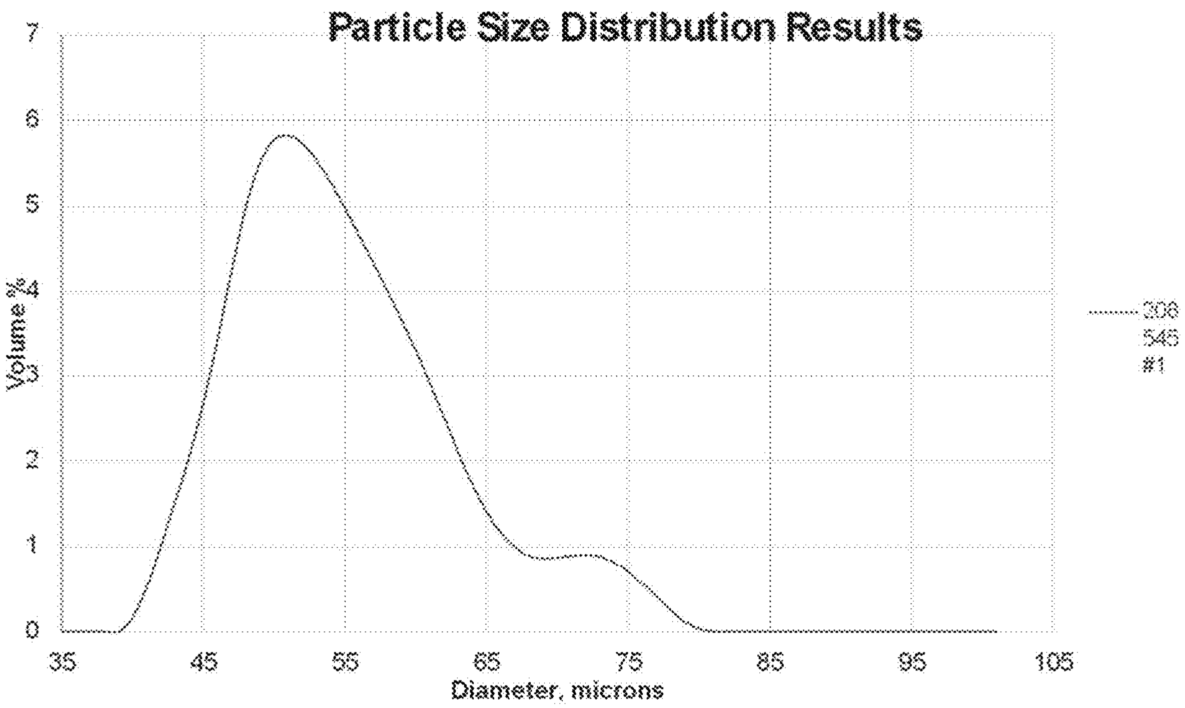
Figure 4G:
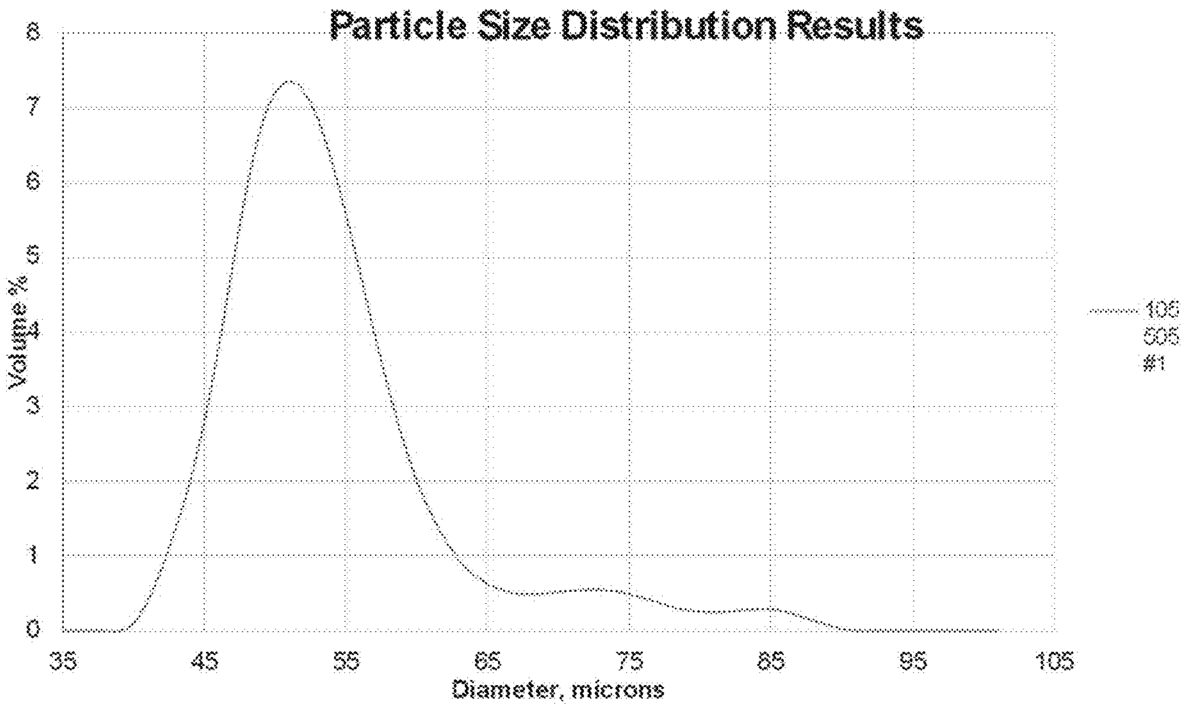
Figure 4H:
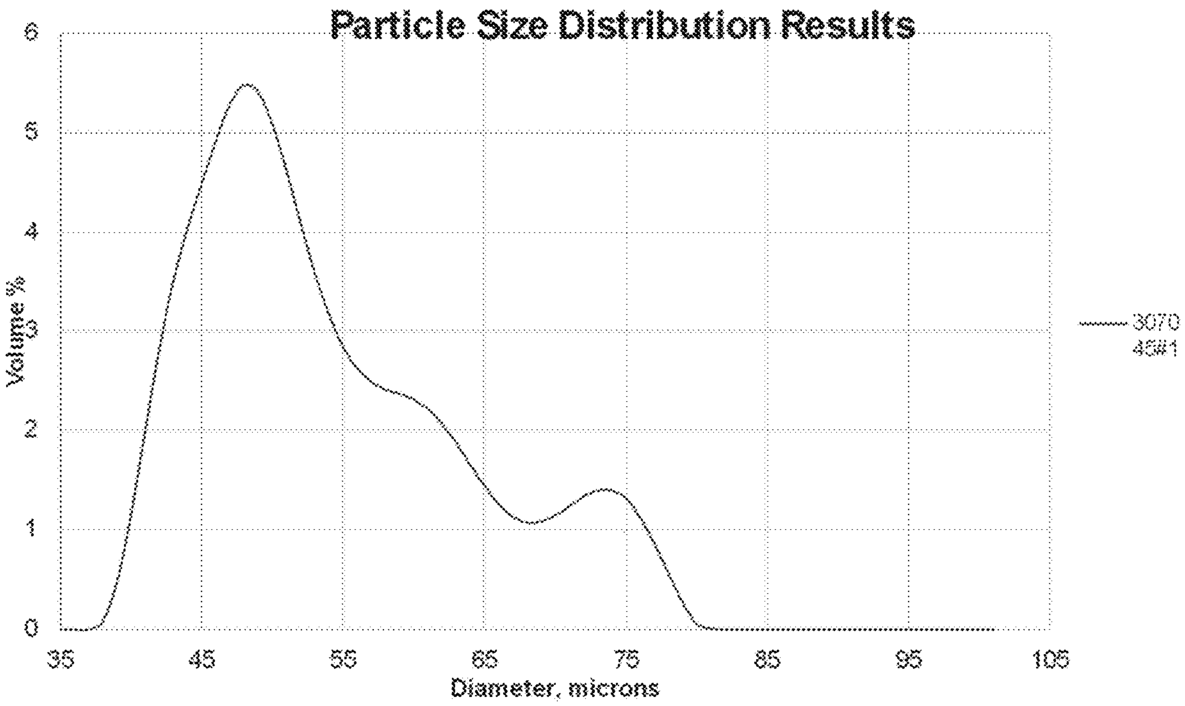
Figure 4I:
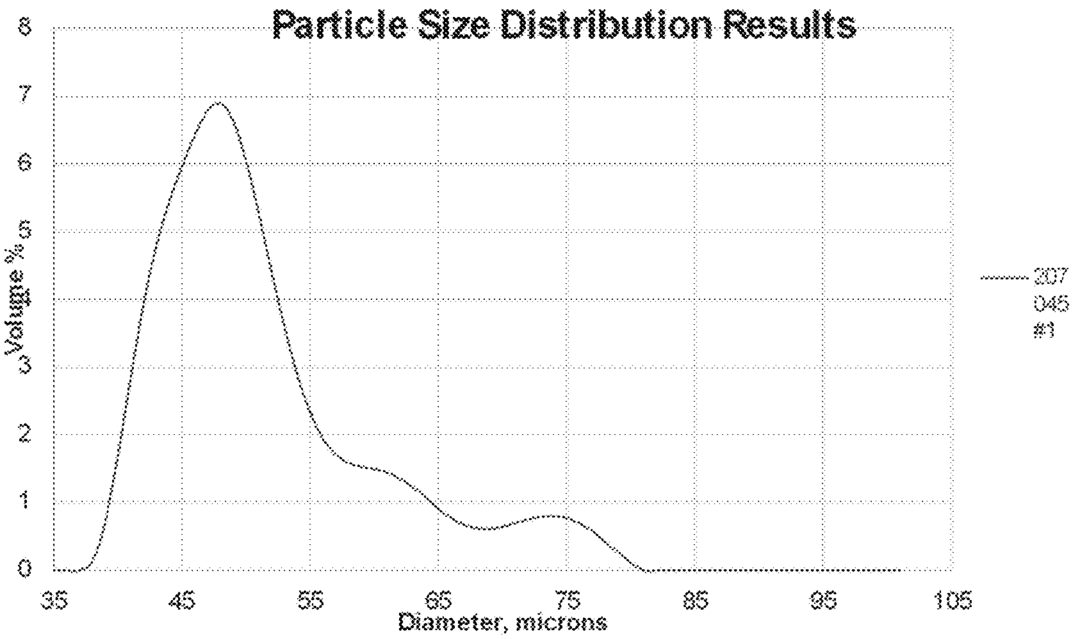
Figure 4J:
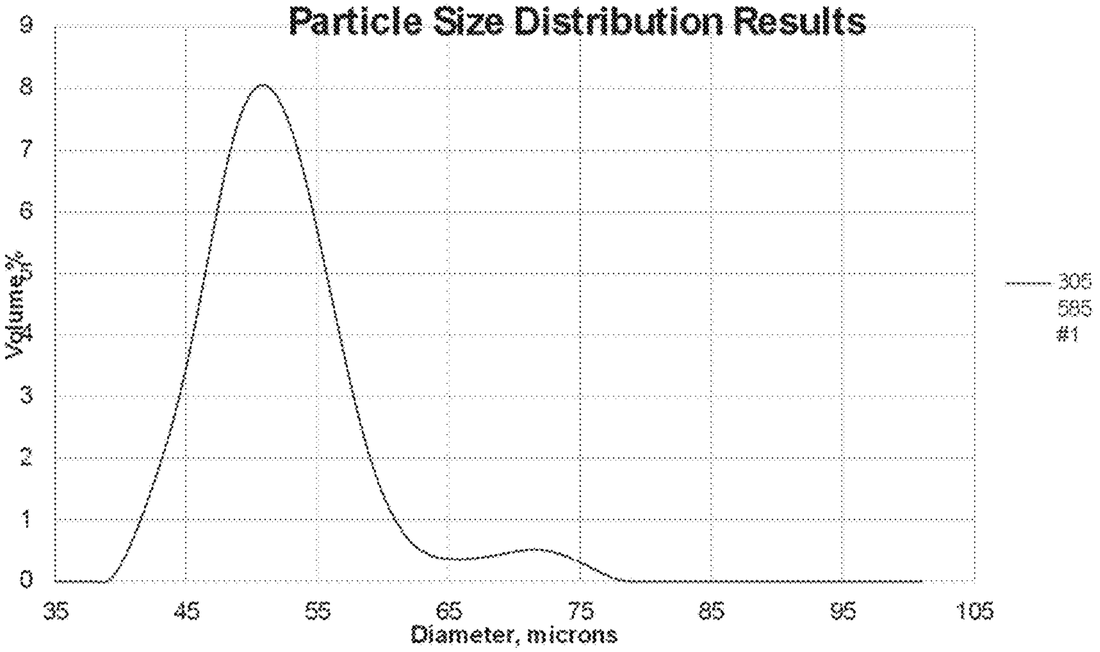
Figure 4K:
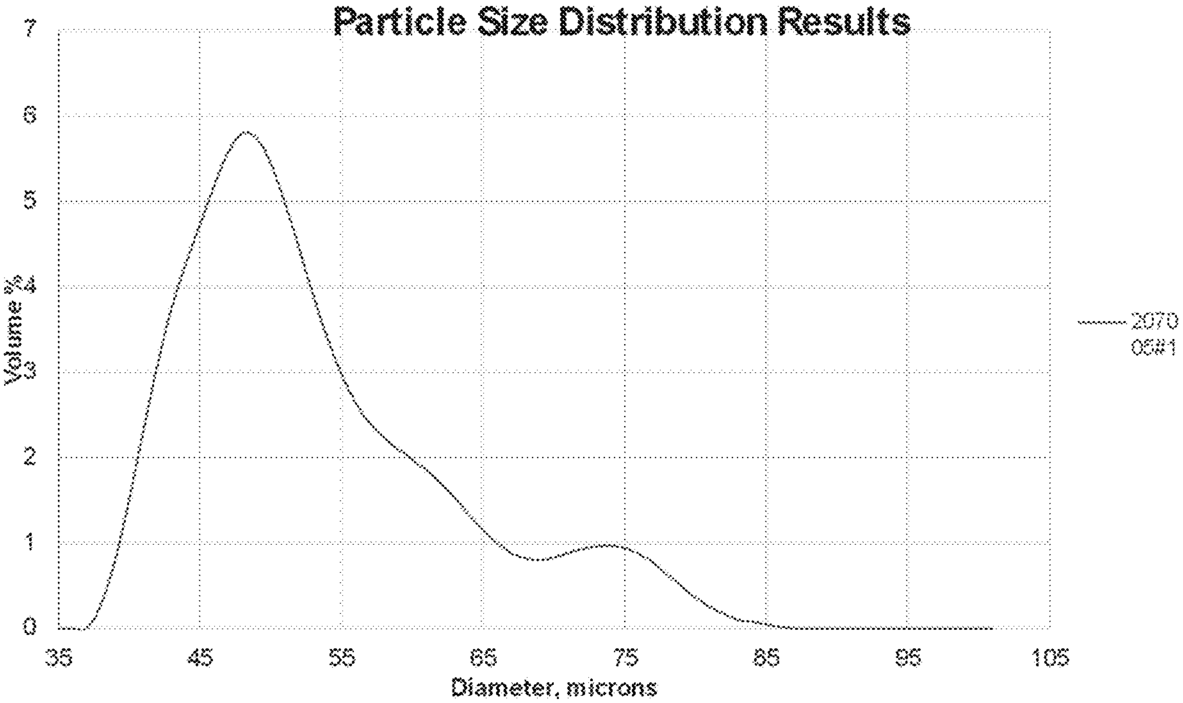
Figure 4L:
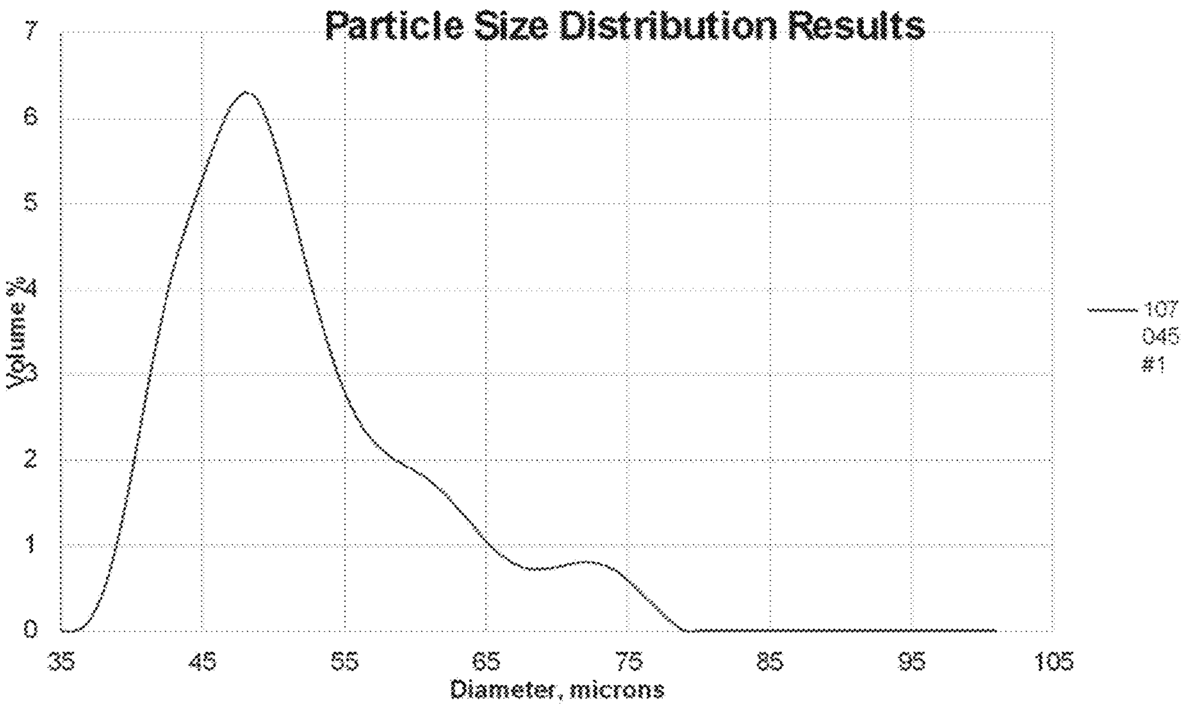
Figure 4M:
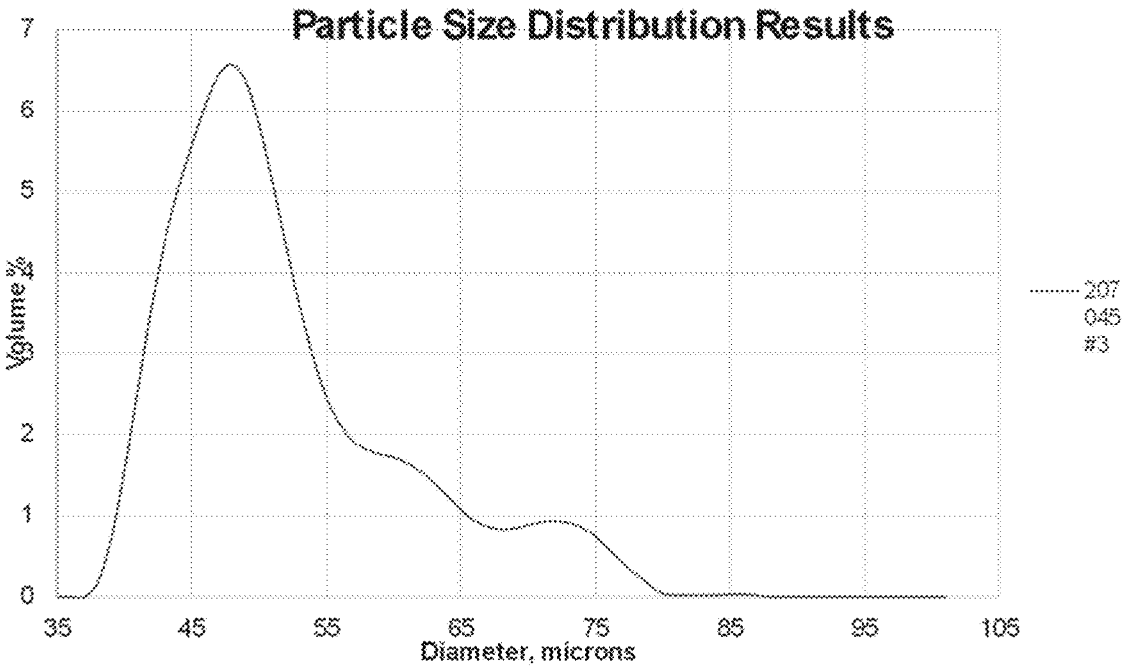
Figure 4N:
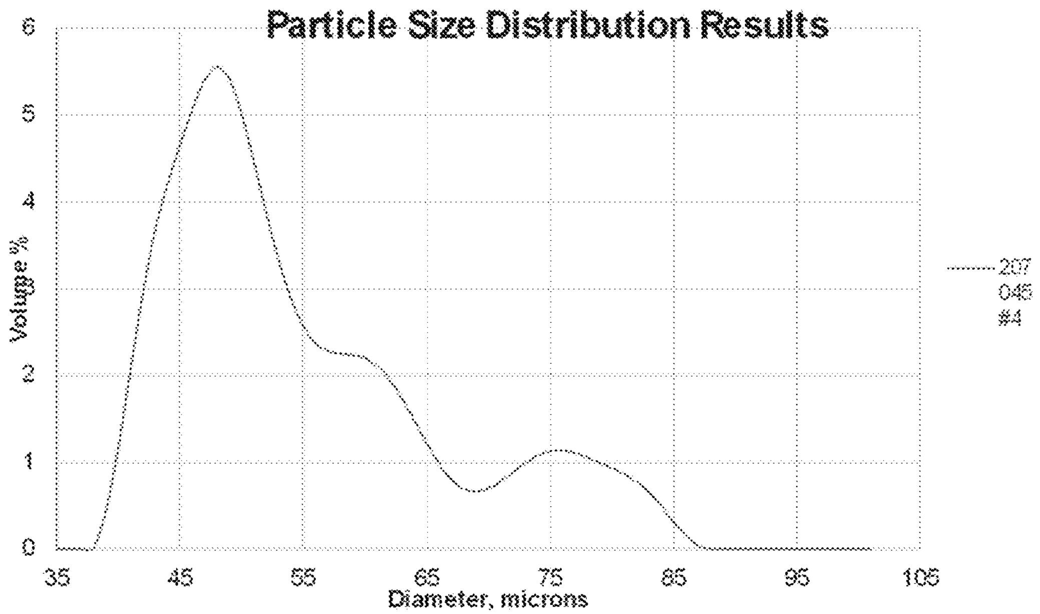
Figure 4O:
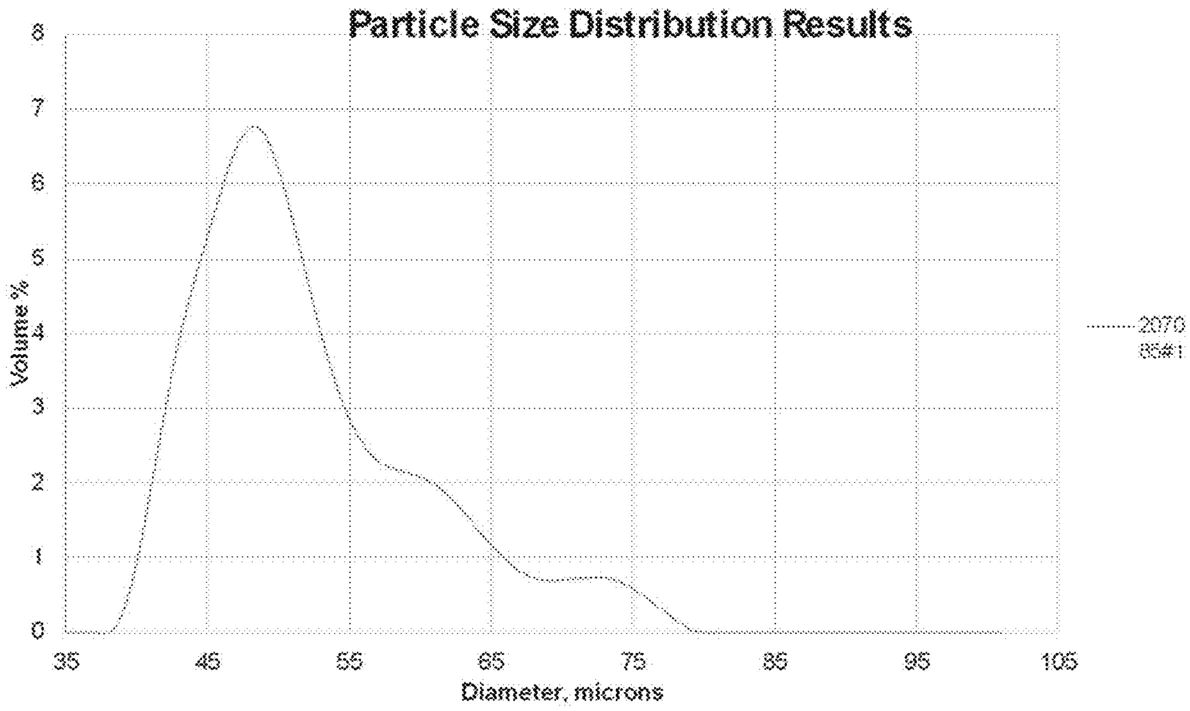
Figure 4P:
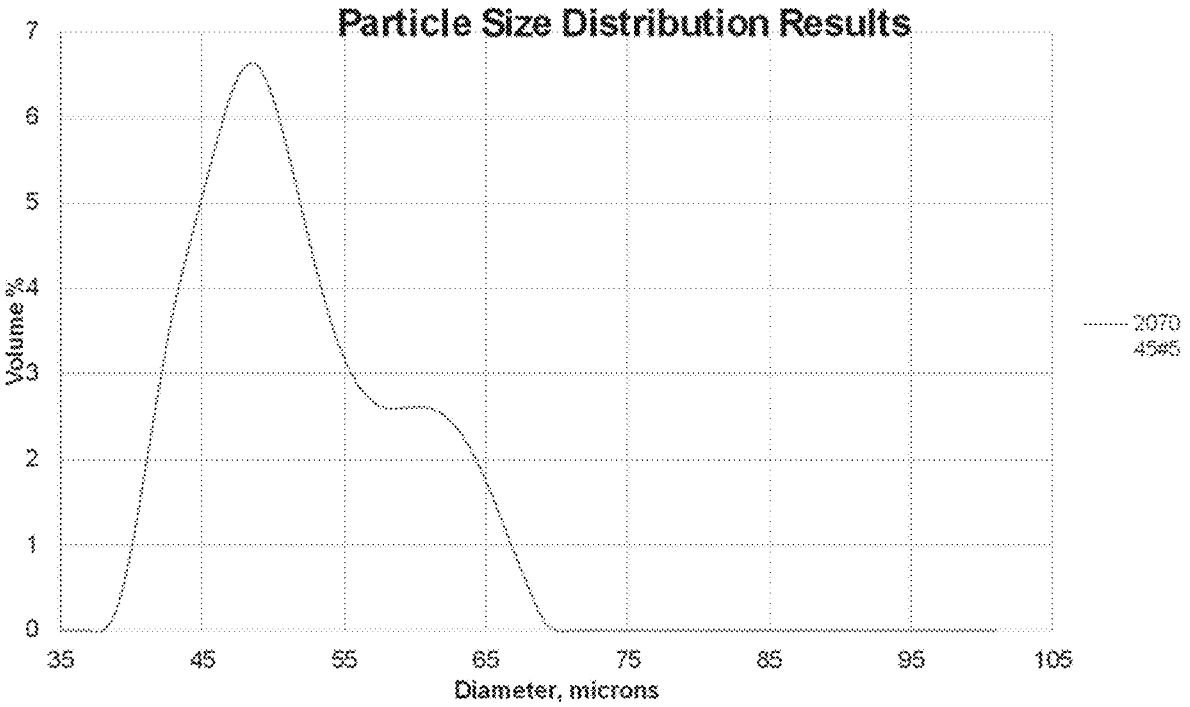
Figure 4Q:
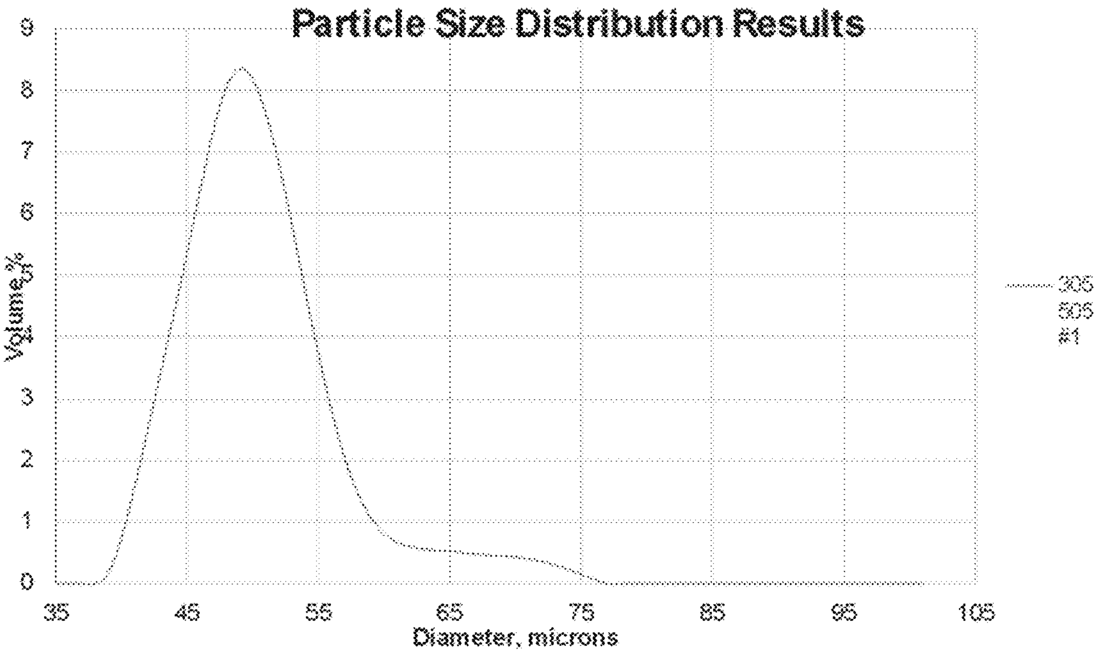
Figure 4R:
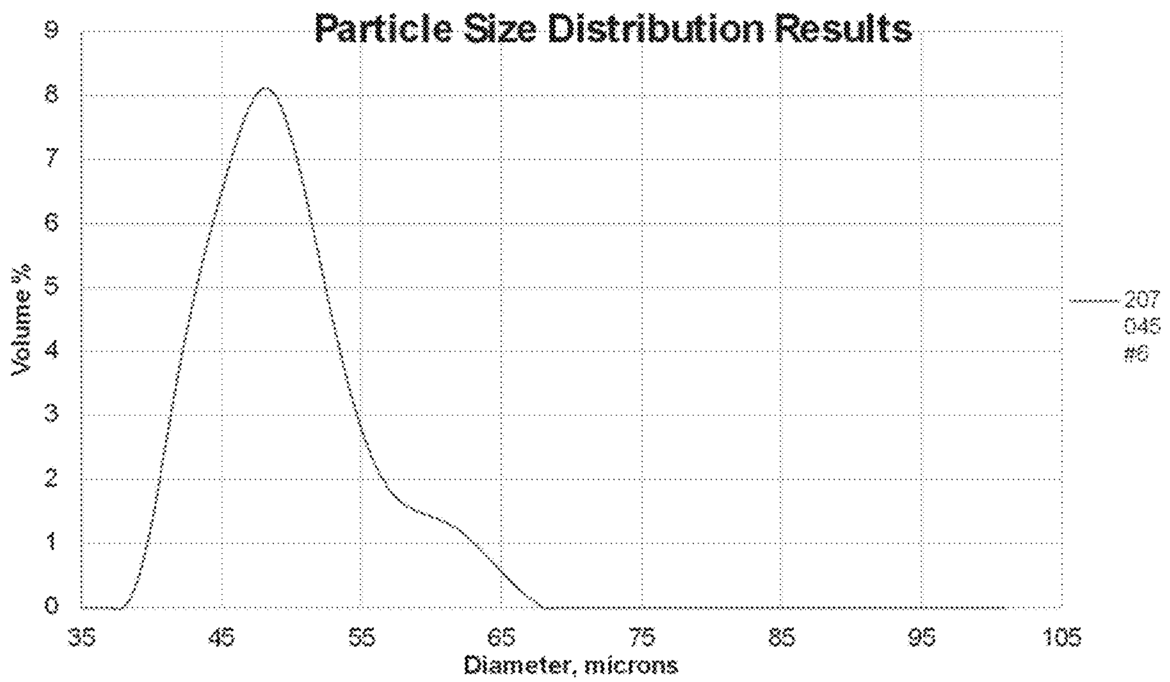
Figure 4S:
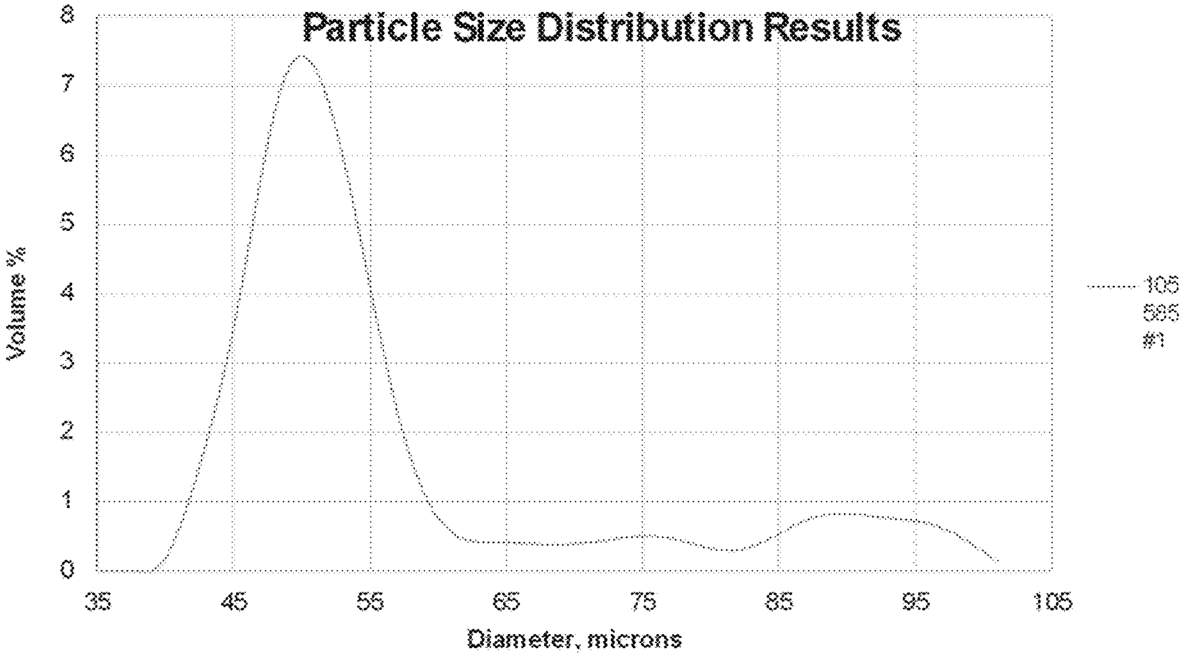
Figure 4T:
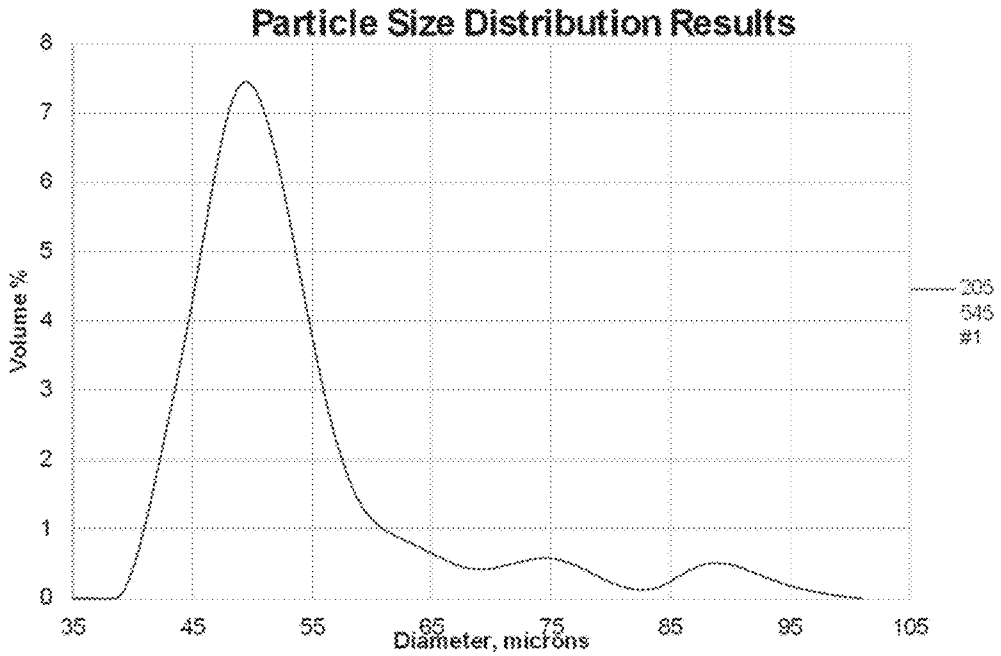
Figure 4U:
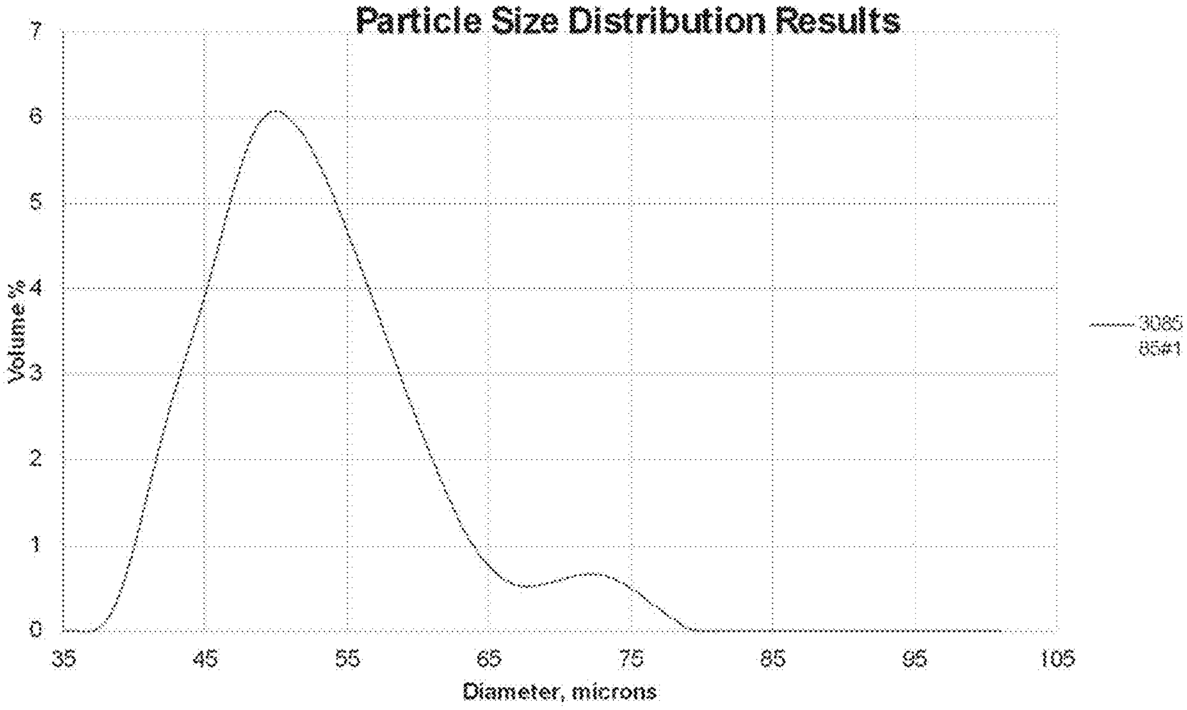

FIGS. 4A-4U shows the particle size distribution results of the optimization experiments, from which the D90 values, as well as solid content percentages and viscosity measurements were extracted for inclusion in Table 4. The data as shown in FIGS. 4A-4U is from samples collected from each test run after to the decantation process, such that larger bran particles are no longer present. As such, the data in FIGS. 4A-4U regarding particle size distributions more closely mirrors what is ultimately delivered to consumers as the beverage product (e.g., oat milk product) in terms of homogeneity and quality.

Table 5 shows a summary of optimization responses and fitted models.

TABLE 5

| Response | Name | Units | Observations | Analysis | Minimum | Maximum | Mean | Std. Dev. | Ratio | Transform | Model |
|---|---|---|---|---|---|---|---|---|---|---|---|
| R1 | D90 | μm | 17 | Polynomial | 12.7 | 116 | 38.87 | 24.43 | 9.13 | No | Reduced Quadratic |
| R2 | Solid % | % | 19 | Polynomial | 14.08 | 28.85 | 24.63 | 3.65 | 2.05 | None | Reduced Quadratic |
| R3 | Viscosity | cP | 14 | Polynomial | 152 | 291 | 217.68 | 42.73 | 1.91 | None | Reduced Quadratic |

Example 4: Optimization of Cavitation Operating Parameters (Operating Factors and Responses)

To optimize the process, certain constraints were set on the set of factors (soaking temperature, liquefaction temperature, and liquefaction time) and set of responses (D90 value, solid content percentage, and viscosity), as shown below in Table 6. The ranges were narrowed in order to find the best operating point; the goal for viscosity was selected with the aim of minimizing overall viscosity.

TABLE 6

| Name | Goal | Lower Limit | Upper Limit | Lower Weight | Upper Weight | Importance |
|---|---|---|---|---|---|---|
| A: Soaking Temp | is in range | 10 | 30 | 1 | 1 | 3 |
| B: Liq_Temp | is in range | 55 | 85 | 1 | 1 | 3 |
| C: Liq_Time | is in range | 5 | 50 | 1 | 1 | 3 |
| D90 | is in range | 12.7 | 50 | 1 | 1 | 3 |
| Solid % | is in range | 25 | 30 | 1 | 1 | 3 |
| Viscosity | minimize | 152 | 291 | 1 | 1 | 3 |

Figure 5:
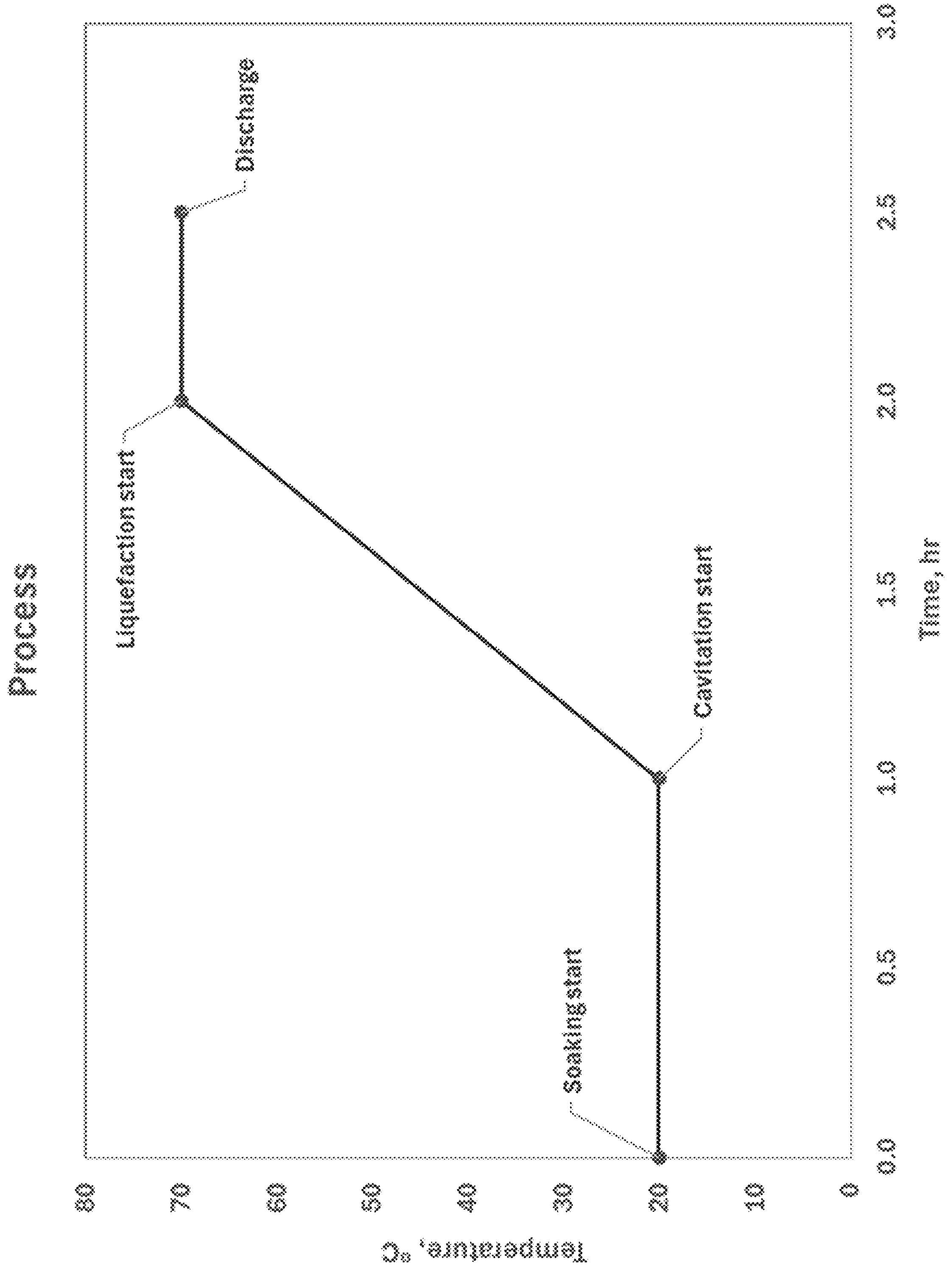
FIG. 5 shows an exemplary cycle of the methods and processes described herein.

Table 7 shows the top optimized operating points for the process, with an exemplary enhanced cavitation cycle shown in FIG. 5. The optimum values are in the range of approximately 10-15° C. for soaking temperature, 65-70° C. for liquefaction temperature, and 40-50 minutes for liquefaction time.

TABLE 7

| Number | Soaking Temp | Liq_Temp | Liq_Time | D90 | Solid % | Viscosity | Desirability |
|---|---|---|---|---|---|---|---|
| 1 | 11.655 | 70.624 | 46.656 | 20.087 | 25.448 | 151.803 | 1.000 |
| 2 | 10.031 | 70.556 | 45.333 | 18.338 | 25.294 | 143.612 | 1.000 |
| 3 | 10.967 | 65.590 | 43.816 | 21.106 | 25.190 | 149.605 | 1.000 |
| 4 | 11.374 | 69.561 | 45.037 | 21.299 | 25.488 | 151.707 | 1.000 |
| 5 | 10.965 | 67.556 | 43.333 | 21.932 | 25.432 | 151.243 | 1.000 |
| 6 | 10.988 | 68.621 | 46.479 | 18.234 | 25.364 | 143.769 | 1.000 |
| 7 | 10.501 | 70.259 | 43.444 | 22.055 | 25.463 | 151.234 | 1.000 |
| 8 | 11.114 | 69.548 | 47.267 | 17.666 | 25.360 | 144.055 | 1.000 |
| 9 | 10.719 | 70.736 | 46.832 | 17.657 | 25.301 | 144.848 | 1.000 |
| 10 | 12.136 | 65.985 | 48.329 | 20.028 | 25.146 | 144.928 | 1.000 |

Of note, the exemplary embodiments of the disclosure described herein do not limit the scope of the invention since these embodiments are merely examples of the embodiments of the invention. Any equivalent embodiments are intended to be within the scope of this invention. Indeed, various modifications of the disclosure, in addition to those shown and described herein, such as alternative useful combinations of the elements described, may become apparent to those skilled in the art from the description. Such modifications and embodiments are also intended to fall within the scope of the appended claims.

Example Definitions and Context

The disclosure is not limited to these example embodiments and applications or to the manner in which the example embodiments and applications operate or are described herein. Moreover, the figures may show simplified or partial views, and the dimensions of elements in the figures may be exaggerated or otherwise not in proportion.

Unless otherwise defined, all technical and scientific terms used herein have the same meaning as commonly understood by a person of ordinary skill in the art to which the present invention pertains. As used herein, and unless stated otherwise or required otherwise by context, each of the following terms shall have the definition set forth below.

Other examples of implementations will become apparent to the person skilled in the art in view of the teachings of the present description and as such, will not be further described here.

Note that titles or subtitles may be used throughout the present disclosure for the convenience of the reader, but in no way should these limit the scope of the invention. Moreover, certain theories may be proposed and disclosed herein; however, in no way should they, whether they are right or wrong, limit the scope of the invention so long as the invention is practiced according to the present disclosure without regard for any particular theory or scheme of action.

Any and all references cited throughout the specification are hereby incorporated by reference in their entirety for all purposes.

It will be understood by those of skill in the art that throughout the present specification, the term "a" used before a term encompasses embodiments containing one or more of what the term refers to. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions, will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

As used herein, the term "substantially free" may refer to a composition or material that contains minimal amounts of a specified component, where such minimal amounts do not materially affect the desired properties or performance of the composition. In some cases, "substantially free" may allow for trace amounts that may be present due to manufacturing processes, environmental factors, or analytical detection limits, but are insufficient to impact the characteristics of the extract, such as the oat groats extract. For example, the expression "substantially free" includes preparations of groat extract (e.g., oat groats extract or oat milk) having less than 5%, 2%, 1%, 0.5%, or 0.1% (particularly less than about 5%) of bran particles after flowing directly to the decanter.

As used herein, the term "mass ratio" or "weight by weight" or "w/w" may refer to the proportional relationship between the masses of two or more components in a composition or mixture, expressed as a ratio of their respective weights. In some embodiments, the ratios described herein describe the weight of enzyme to groats (e.g., oat groats).

As used herein, the term "groat" or "groats" may refer to the hulled kernel of a grain after the outer hull has been removed. In some embodiments, a groat may retain the bran layer, germ, and endosperm, representing the intact inner portion of the grain. The term may encompass groats derived from various cereal grains including oats, and may include groats that maintain a whole kernel structure that have been cleaned, or otherwise prepared for further processing or consumption. In some embodiments, the groats are oat groats.

As used herein, the term "clarified" may refer to a liquid that has been processed to remove or dissolve suspended particles, sediment, or other insoluble particles. In some embodiments, clarification may be accomplished through various methods such as filtration, centrifugation, settling, or enzymatic treatment that separates solid matter from the liquid phase. In some embodiments, the extract (e.g., oat groats extract) are separated from particles of a certain D90 size while retaining the soluble fraction.

As used herein, the term "enzyme" may refer to a protein or protein complex that catalyzes biochemical reactions. In some embodiments, an enzyme may be naturally occurring or recombinantly produced, and may include enzymes that are artificially optimized for various properties such as stability and/or catalysis. In some embodiments, the enzyme is an amylase.

As used herein, the term "amylase" may refer to an enzyme that catalyzes the hydrolysis of starch and other polysaccharides by cleaving glycosidic bonds. In some embodiments, amylase may include alpha-amylases, which may cleave alpha-1,4-glycosidic bonds within starch molecules to produce shorter chain oligosaccharides and sugars. The term may encompass amylases derived from various sources including plants, animals, bacteria, fungi, or produced through recombinant methods, and may include different forms such as endo-acting amylases that cleave bonds within the polymer chain or exo-acting amylases that remove units from the chain ends.

As used herein, the term "D90" may refer to a particle size distribution parameter indicating that 90% of particles in a sample have a diameter smaller than the D90 value.

As used herein, the term "cavitation", which is also referred to herein as "hydrodynamic cavitation," which refers to the phenomenon in which the static pressure of a liquid reduces to below the liquid's vapor pressure, leading to the formation of small vapor-filled cavities in the liquid. When subjected to higher pressure, these cavities, called "bubbles" or "voids", collapse and can generate shock waves.

As used herein, the term "liquefaction" refers to converting a solid or semi-solid ingredient, such as groats, into a liquid state. In some embodiments, liquefaction may occur through the application of one or more enzymes. In some embodiments, the liquefaction process comprises gelatinizing starch and treating with an enzyme, such as alpha-amylase and beta-amylase, which fragments the starch into regularly sized chains, resulting in products such as dextrin, maltose, maltotriose and maltopentaose.

Additional Considerations

The headers and subheaders between sections and sub-sections of this document are included solely for the purpose of improving readability and do not imply that features cannot be combined across sections and subsection. Accordingly, sections and subsections do not describe separate embodiments.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure. Thus, it should be understood that although the present disclosure has been specifically disclosed by embodiments and optional features, modification and variation of the concepts herein disclosed may be resorted to by those skilled in the art, and that such modifications and variations are considered to be within the scope of this disclosure as defined by the appended claims.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

Further, the subject matter described herein can be embodied in systems, apparatus, methods, and/or articles depending on the desired configuration. The implementations set forth in the description do not represent all implementations consistent with the subject matter described. Instead, they are merely examples consistent with aspects related to the described subject matter. Although certain variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in any relevant accompanying figures and/or described herein do not necessarily require the particular order shown, or sequential order, to achieve desirable results. Other implementations may be within the scope of the following claims.

What is claimed is:

1. A method of making a volume of a groat extract, the method comprising:

(a) adding water to an amount of groat to produce a groat-water mixture;

(b) soaking the groat-water mixture at a soaking temperature between 10-15° C.;

(c) adding a single amount of enzyme to the groat-water mixture to produce a groat-water-enzyme mixture;

(d) maintaining the groat-water-enzyme mixture between 10-15° C.;

(e) subjecting the groat-water-enzyme mixture to a process to produce a groat extract characterized by a particle size distribution (D90 particle size) of 450 microns or less, wherein the process is carried out in a cavitation vessel;

wherein the process consists of a single cavitation step and a single liquefaction step; wherein the cavitation step begins at a cavitation start temperature between 10-15° C.; and wherein the liquefaction step is 30 minutes or longer at a liquefaction temperature between 65-70° C.; and (f) centrifuging the groat extract in a decanter centrifuge to produce a groat extract that is characterized by a D90 of 25 microns or less;

with the proviso that no additional enzyme is added to the cavitation vessel.

2. The method of claim 1, wherein the amount of enzyme is 0.2% w/w or more enzyme to groat.

3. The method of claim 1, wherein the enzyme is an amylase enzyme.

4. The method of claim 1, wherein the duration of the cavitation step is determined by a temperature increasing stage.

5. The method of claim 1, wherein the duration of the cavitation step is determined by the liquefaction temperature.

6. The method of claim 1, wherein the volume of the groat-water mixture is at least 100 liters.

7. The method of claim 1, wherein the amount of groat is at least 40 kg or more.

8. The method of claim 1, wherein the amount of groat is about 150 kg or more.

9. The method of claim 1, wherein the groat-water mixture is a ratio of about 1:1 w/w groat to water about 1:10 w/w groat to water.

10. The method of claim 1, wherein the method further comprises increasing the ratio of the groat-water mixture by adding a volume of a liquid to the groat-water mixture prior to the cavitation step to arrive at a cavitation ratio.

11. The method of claim 10, wherein the cavitation ratio is about 1:2 w/w groat to water.

12. The method of claim 1, wherein the groat extract is substantially free of bran particles.

13. The method of claim 1, wherein the groat is oat groat.

* * * * *